(12) United States Patent
Yang et al.

(10) Patent No.: US 12,041,009 B2
(45) Date of Patent: Jul. 16, 2024

(54) TECHNIQUES FOR ASSISTED DOWNLINK HARQ FEEDBACK IN CARRIER AGGREGATION MODE

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/918,932

(22) Filed: Jul. 1, 2020

(65) Prior Publication Data

US 2022/0006592 A1    Jan. 6, 2022

(51) Int. Cl.
*H04L 5/00*    (2006.01)

(52) U.S. Cl.
CPC ............ *H04L 5/0055* (2013.01); *H04L 5/001* (2013.01)

(58) Field of Classification Search
CPC ..... H04L 5/0055; H04L 5/001; H04L 1/1671; H04L 1/1854; H04L 1/1864; H04L 1/1896
USPC ........................................................ 370/330
See application file for complete search history.

(56) References Cited

U.S. PATENT DOCUMENTS

| | | | |
|---|---|---|---|
| 2011/0237202 A1* | 9/2011 | Uemura | H04W 36/0088 455/67.14 |
| 2012/0113832 A1* | 5/2012 | Montojo | H04W 72/02 370/252 |
| 2014/0226608 A1* | 8/2014 | Seo | H04L 5/0057 370/329 |
| 2015/0215947 A1* | 7/2015 | Kaukovuori | H04W 72/541 370/329 |
| 2017/0264398 A1 | 9/2017 | Uchino et al. | |
| 2018/0167116 A1* | 6/2018 | Rahman | H04B 7/0639 |
| 2018/0309561 A1* | 10/2018 | Nozawa | H04L 5/14 |
| 2019/0149271 A1* | 5/2019 | Yin | H04L 1/1816 370/329 |

(Continued)

FOREIGN PATENT DOCUMENTS

| | | |
|---|---|---|
| EP | 2522191 A1 | 11/2012 |
| EP | 3648369 A1 | 5/2020 |

(Continued)

OTHER PUBLICATIONS

International Search Report and Written Opinion—PCT/US2021/035696—ISA/EPO—Sep. 23, 2021.

(Continued)

*Primary Examiner* — Mang Hang Yeung

(74) *Attorney, Agent, or Firm* — Dalei Dong; Holland & Hart LLP

(57) ABSTRACT

Methods, systems, and devices for wireless communications are described. The method includes transmitting, to a base station based on a parameter of a configuration of the UE, a first HARQ feedback configuration or a request to modify the configuration of the UE, or both, the configuration of the UE including a carrier aggregation configuration and receiving, from the base station based on transmitting the first HARQ feedback configuration or request to modify the configuration of the UE, or both, a second HARQ feedback configuration or reconfiguration.

25 Claims, 15 Drawing Sheets

(56) References Cited

U.S. PATENT DOCUMENTS

| | | | |
|---|---|---|---|
| 2019/0150161 A1* | 5/2019 | Cheng | H04J 11/0076 370/330 |
| 2020/0145169 A1* | 5/2020 | Zhou | H04L 5/0055 |
| 2021/0385029 A1* | 12/2021 | Guo | H04J 13/16 |
| 2021/0410077 A1* | 12/2021 | Guo | H04W 52/367 |
| 2022/0006570 A1* | 1/2022 | Lee | H04W 72/087 |

FOREIGN PATENT DOCUMENTS

| | | |
|---|---|---|
| WO | WO-2016167987 A1 | 10/2016 |
| WO | WO-2020132570 A1 | 6/2020 |

OTHER PUBLICATIONS

Sierra Wireless: "Pre-Configured UL Resources Design Considerations", 3GPP Draft, 3GPP TSG RAN WG2 Meeting #104, R2-1817940, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018, Nov. 12, 2018 (Nov. 12, 2018), XP051557451, 9 Pages, Retrieved from the Internet: URL: http://www.3gpp.org/ftp/Meetings%5F3GPP%5FSYNC/RAN2/Docs/R2%2D1817940%2Ezip [retrieved on Nov. 12, 2018], paragraph [0003], section 3.

\* cited by examiner

US 12,041,009 B2

TECHNIQUES FOR ASSISTED DOWNLINK HARQ FEEDBACK IN CARRIER AGGREGATION MODE

FIELD OF TECHNOLOGY

The following relates generally to wireless communications and more specifically to techniques for assisted downlink hybrid automatic repeat request (HARQ) feedback in carrier aggregation mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may move beyond some coverage area where a link imbalance may occur. In some cases, throughput may decrease and errors may result from the link imbalance. UE and network procedures in coverage areas with link imbalances may be deficient.

SUMMARY

The described techniques relate to improved methods, systems, devices, and apparatuses that support techniques for assisted downlink hybrid automatic repeat request (HARQ) feedback in carrier aggregation mode. Generally, the described techniques provide for enabling a UE to request a downlink HARQ feedback configuration, a channel state information (CSI) configuration, or a request to modify a current configuration of the UE. In some examples, a UE may transmit a message to a base station requesting one or more preferences of the UE regarding a configuration of the UE (e.g., requesting a modification of a current downlink HARQ feedback configuration, or requesting a new downlink HARQ feedback configuration, or requesting a modification of a current CSI configuration, or requesting a new CSI configuration, or any combination thereof). In some cases, the base station may transmit a confirmation message to the UE via a RRC setup message, or a RRC resume message, or a RRC reconfiguration message, or a media access control-control element (MAC-CE) message, or a downlink control information, or any combination thereof. In some examples, the confirmation message may include a HARQ feedback configuration, HARQ feedback reconfiguration, a CSI configuration, or CSI reconfiguration, or any combination thereof.

A method of wireless communications at a UE is described. The method may include transmitting, to a base station based on a parameter of a configuration of the UE, a first HARQ feedback configuration or a request to modify the configuration of the UE, or both, the configuration of the UE including a carrier aggregation configuration and receiving, from the base station based on transmitting the first HARQ feedback configuration or request to modify the configuration of the UE, or both, a second HARQ feedback configuration or reconfiguration.

An apparatus for wireless communications at a UE is described. The apparatus may include a processor, memory coupled with the processor, and instructions stored in the memory. The instructions may be executable by the processor to cause the apparatus to transmit, to a base station based on a parameter of a configuration of the UE, a first HARQ feedback configuration or a request to modify the configuration of the UE, or both, the configuration of the UE including a carrier aggregation configuration and receive, from the base station based on transmitting the first HARQ feedback configuration or request to modify the configuration of the UE, or both, a second HARQ feedback configuration or reconfiguration.

Another apparatus for wireless communications at a UE is described. The apparatus may include means for transmitting, to a base station based on a parameter of a configuration of the UE, a first HARQ feedback configuration or a request to modify the configuration of the UE, or both, the configuration of the UE including a carrier aggregation configuration and receiving, from the base station based on transmitting the first HARQ feedback configuration or request to modify the configuration of the UE, or both, a second HARQ feedback configuration or reconfiguration.

A non-transitory computer-readable medium storing code for wireless communications at a UE is described. The code may include instructions executable by a processor to transmit, to a base station based on a parameter of a configuration of the UE, a first HARQ feedback configuration or a request to modify the configuration of the UE, or both, the configuration of the UE including a carrier aggregation configuration and receive, from the base station based on transmitting the first HARQ feedback configuration or request to modify the configuration of the UE, or both, a second HARQ feedback configuration or reconfiguration.

Some examples of the method, apparatuses, and non-transitory computer-readable medium described herein may further include operations, features, means, or instructions for transmitting the first HARQ feedback configuration or request to modify the configuration of the UE during a call setup operation, or during a call resume operation, or during a handover preparation operation, or during an on-going call, or in a radio resource control message, or in a measurement report, or a unified air interface (UAI) message, or any combination thereof.

In some examples of the method, apparatuses, and non-transitory computer-readable medium described herein, the first HARQ feedback configuration or request to modify the configuration of the UE may be transmitted via a RRC setup message, or a RRC resume message, or a power measurement report, or a signal quality report, or any combination thereof.

In some examples of the method, apparatuses, and non-transitory computer-readable medium described herein, the second HARQ feedback configuration or reconfiguration may be received via a RRC setup message, or a RRC resume message, or a RRC reconfiguration message, or a media access control-control element (MAC-CE) message, or a downlink control information message, or any combination thereof.

Some examples of the method, apparatuses, and non-transitory computer-readable medium described herein may further include operations, features, means, or instructions for implementing the one or more preferences of the UE for the configuration of the UE based on receiving the second HARQ feedback configuration or reconfiguration, and transmitting an implementation complete message to the base station.

In some examples of the method, apparatuses, and non-transitory computer-readable medium described herein, the one or more preferences of the UE includes using one physical uplink channel group or multiple physical uplink channel groups for downlink feedback.

In some examples of the method, apparatuses, and non-transitory computer-readable medium described herein, the one or more preferences of the UE includes using a static codebook or a dynamic codebook for the downlink feedback.

In some examples of the method, apparatuses, and non-transitory computer-readable medium described herein, the one or more preferences of the UE includes bundling the downlink feedback or multiplexing the downlink feedback.

In some examples of the method, apparatuses, and non-transitory computer-readable medium described herein, the downlink feedback includes downlink HARQ feedback.

In some examples of the method, apparatuses, and non-transitory computer-readable medium described herein, the one or more preferences of the UE includes enabling the UE to switch between a carrier aggregation mode and a dual connectivity mode.

In some examples of the method, apparatuses, and non-transitory computer-readable medium described herein, the one or more preferences of the UE includes enabling the UE to switch between a time division duplex spectrum and a frequency division duplex spectrum.

In some examples of the method, apparatuses, and non-transitory computer-readable medium described herein, the one or more preferences of the UE includes enabling the UE to switch between a first frequency range and a secondary frequency range.

In some examples of the method, apparatuses, and non-transitory computer-readable medium described herein, the one or more preferences of the UE includes using a primary cell or using a primary secondary cell, or switching between the primary cell and the primary secondary cell.

In some examples of the method, apparatuses, and non-transitory computer-readable medium described herein, the one or more preferences of the UE includes using a code block group (CBG) based acknowledgment feedback configuration or using a non-CBG acknowledgment feedback configuration.

In some examples of the method, apparatuses, and non-transitory computer-readable medium described herein, the one or more preferences of the UE includes using a slot based acknowledgment feedback configuration or using a sub-slot based acknowledgment feedback configuration.

In some examples of the method, apparatuses, and non-transitory computer-readable medium described herein, the one or more preferences of the UE includes multiplexing channel state information and acknowledgment feedback, or dropping transmission of channel state information and maintaining transmission of acknowledgment feedback, or dropping transmission of acknowledgment feedback and maintaining transmission of channel state information, or any combination thereof.

In some examples of the method, apparatuses, and non-transitory computer-readable medium described herein, the one or more preferences of the UE includes using a physical uplink control channel resource identifier within a physical uplink control channel resource set.

In some examples of the method, apparatuses, and non-transitory computer-readable medium described herein, the one or more preferences of the UE includes using channel state information omission rules to drop at least one component of a channel state information report.

In some examples of the method, apparatuses, and non-transitory computer-readable medium described herein, the one or more preferences of the UE includes using a specified codebook type and a specified number of layers based on a number of bits used in channel state information.

In some examples of the method, apparatuses, and non-transitory computer-readable medium described herein, the one or more preferences of the UE includes using a specified physical uplink control channel format and repetition, or using intra slot frequency hopping, or using inter slot frequency hopping, or using physical uplink control channel sequence hopping, or using any combination thereof.

In some examples of the method, apparatuses, and non-transitory computer-readable medium described herein, the one or more preferences of the UE for the configuration of the UE includes at least one preference for the first HARQ feedback configuration or at least one preference for a CSI configuration, or both.

In some examples of the method, apparatuses, and non-transitory computer-readable medium described herein, the parameter of the configuration of the UE includes a transmit power class, or channel bandwidth relative to at least one subcarrier spacing (SCS), or power consumption, or a bandwidth difference, or SCS difference, or quality of service (QoS) constraint, or any combination thereof.

In some examples of the method, apparatuses, and non-transitory computer-readable medium described herein, the transmit power class of the UE includes a high power transmit class, or a medium power transmit class, or a low power transmit class, or any combination thereof.

A method of wireless communications at a base station is described. The method may include receiving, from a UE, a first HARQ feedback configuration or request to modify a configuration of the UE, or both, the configuration of the UE including a carrier aggregation configuration, implementing, based on a network condition, at least a portion of one or more preferences of the UE included in the message, and transmitting, to the UE, a second HARQ feedback configuration or reconfiguration.

An apparatus for wireless communications at a base station is described. The apparatus may include a processor, memory coupled with the processor, and instructions stored in the memory. The instructions may be executable by the processor to cause the apparatus to receive, from a UE, a first HARQ feedback configuration or request to modify a configuration of the UE, or both, the configuration of the UE including a carrier aggregation configuration, implement, based on a network condition, at least a portion of one or more preferences of the UE included in the message, and transmit, to the UE, a second HARQ feedback configuration or reconfiguration.

Another apparatus for wireless communications at a base station is described. The apparatus may include means for receiving, from a UE, a first HARQ feedback configuration or request to modify a configuration of the UE, or both, the configuration of the UE including a carrier aggregation configuration, implementing, based on a network condition, at least a portion of one or more preferences of the UE included in the message, and transmitting, to the UE, a second HARQ feedback configuration or reconfiguration.

A non-transitory computer-readable medium storing code for wireless communications at a base station is described. The code may include instructions executable by a processor to receive, from a UE, a first HARQ feedback configuration or request to modify a configuration of the UE, or both, the configuration of the UE including a carrier aggregation configuration, implement, based on a network condition, at least a portion of one or more preferences of the UE included in the message, and transmit, to the UE, a second HARQ feedback configuration or reconfiguration.

In some examples of the method, apparatuses, and non-transitory computer-readable medium described herein, the second HARQ feedback configuration or reconfiguration may be transmitted via a RRC setup message, or a RRC resume message, or a RRC reconfiguration message, or a media access control-control element (MAC-CE) message, or a downlink control information message, or any combination thereof.

In some examples of the method, apparatuses, and non-transitory computer-readable medium described herein, the first HARQ feedback configuration or request to modify the configuration of the UE is received via a RRC setup message, or a RRC resume message, or a power measurement report, or a signal quality report, or any combination thereof.

In some examples of the method, apparatuses, and non-transitory computer-readable medium described herein, the one or more preferences of the UE may be based on a downlink feedback configuration of the UE or a channel state information configuration of the UE, or both.

In some examples of the method, apparatuses, and non-transitory computer-readable medium described herein, the downlink feedback includes downlink HARQ feedback.

In some examples of the method, apparatuses, and non-transitory computer-readable medium described herein, implementing the at least portion of the one or more preferences of the UE may include operations, features, means, or instructions for determining whether to modify the UE configuration based on the network condition and at least a portion of the one or more preferences of the UE, or determining whether to modify the UE configuration based on the network condition while disregarding the one or more preferences of the UE.

Some examples of the method, apparatuses, and non-transitory computer-readable medium described herein may further include operations, features, means, or instructions for receiving the first HARQ feedback configuration or request to modify the configuration of the UE during a call setup operation, or during a call resume operation, or during a handover preparation operation, or during an on-going call, or in a radio resource control message, or in a measurement report, or in a unified air interface (UAI) message, or any combination thereof.

In some examples of the method, apparatuses, and non-transitory computer-readable medium described herein, the network condition includes a traffic buffer size, or a power measurement report from the UE, or a power headroom report from the UE, or SRS, or a signal-to-interference ratio (SINR), or an inter-site carrier aggregation limit, or a transport latency, or a transport bandwidth, or a radio access network split option, or measurement information from the UE, or any combination thereof.

Some examples of the method, apparatuses, and non-transitory computer-readable medium described herein may further include operations, features, means, or instructions for transmitting the second HARQ feedback configuration to the UE based on receiving the first HARQ feedback configuration from the UE, or transmitting the reconfiguration to the UE based on receiving the request to modify the configuration of the UE.

DETAILED DESCRIPTION

Figure 1:
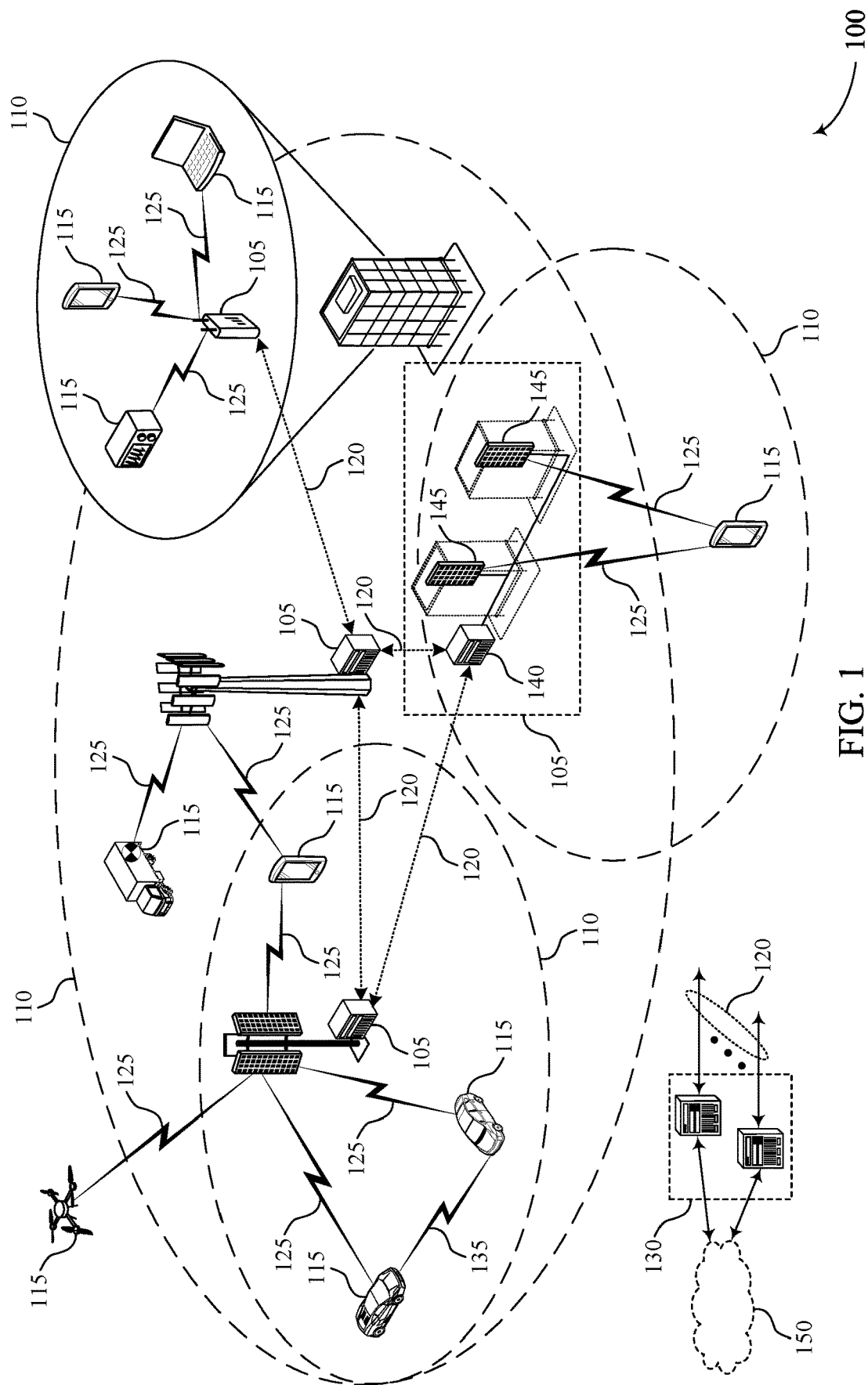
FIG. 1 illustrates an example of a system for wireless communications that supports techniques for assisted downlink HARQ feedback in carrier aggregation mode in accordance with aspects of the present disclosure.

In some systems, a UE may use frequency division duplexing and time division duplexing (FDD, or TDD, or FDD+TDD) carrier aggregation. In some cases, the UE may move beyond some coverage area (e.g., beyond an area where uplink (UL) and downlink (DL) TDD coverage are relatively balanced, beyond a sounding reference signal (SRS) coverage area, etc.). The UE may enter or be located in a region of a coverage area where UL TDD signal quality or a UL TDD power measurement is relatively low (e.g., an area where UL coverage is diminished while the DL coverage is relatively maintained). In some systems, a link imbalance may occur in a mid-band link budget based on the UL/DL imbalance. In some cases, a mid-TDD band or millimeter wave (mmW) band may experience a UL/DL link imbalance in some coverage areas. The UL/DL imbalance may result in HARQ feedback errors. In some cases, new radio (NR) carrier aggregation DL throughput may be negatively impacted by the HARQ feedback errors due to duplicated DL physical downlink shared channel (PDSCH) retransmissions or duplicated physical uplink control channel (PDSCH) discontinuous reception (DTX).

When a UE enters coverage areas where the UE experiences UL/DL imbalances, optimized performance may not be achieved unless the UE provides a base station with UE assistance information. Based on different parameters of a UE configuration, the UE may provide assistance information to the base station to optimize performance when the UE is in coverage areas with UL/DL imbalances. In some cases, the UE may transmit an assistance information message to the base station. When the base station receives the assistance information message, the base station may determine whether to implement the requested UE preferences based on network conditions determined by the base station, based on the assistance information message, or based on both. In some cases, the base station may send a confirmation message to the UE that confirms the base station is implementing at least a portion of the preferences requested by the UE in the assistance information message. The base station may grant at least a portion of the preferences requested by the UE or may deny the requested preferences of the UE. In some cases, the base station may determine whether to implement at least a portion of the preferences requested by the UE in response to the base station receiving the request from the UE (e.g., based on receiving the assistance information message). The base station may determine whether to implement a new UE configuration (e.g., a configuration requested by the UE or a configuration configured by the base station) or modify an existing UE configuration (e.g., modify the UE configuration based on the preferences requested by the UE or based on modifications configured by the base station) based on the network conditions determined by the base station, or based on the base station evaluating the preferences requested by the UE, or based at least in part on both. The base station may determine whether to implement a new UE configuration or modify an existing UE configuration based on the network conditions while disregarding the requested UE preferences (e.g., disregarding the information in the assistance information message).

Aspects of the disclosure are initially described in the context of wireless communications systems. Aspects of the disclosure are further illustrated by and described with reference to apparatus diagrams, system diagrams, and flowcharts that relate to wireless communications subsystems. Aspects of the disclosure are further illustrated by and described with reference to apparatus diagrams, system diagrams, and flowcharts that relate to process flows. Aspects of the disclosure are further illustrated by and described with reference to apparatus diagrams, system diagrams, and flowcharts that relate to techniques for assisted downlink HARQ feedback in carrier aggregation mode.

FIG. 1 illustrates an example of a wireless communications system 100 that supports techniques for assisted downlink HARQ feedback in carrier aggregation mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE (e.g., a first UE 115 of FIG. 1) may generate a message based on one or more parameters of a configuration of the UE. The UE may transmit the message to a base station. The message may include one or more preferences of the UE associated with the configuration (e.g., downlink hybrid automatic repeat request (HARQ) feedback configuration) of the UE. In some cases, the one or more preferences may be based on the one or more parameters of the configuration of the UE. In some examples, the base station may transmit a HARQ feedback configuration or reconfiguration to the UE in response to the base station receiving and processing the message from the UE. In some examples, the UE may receive a confirmation message from the base station that confirms implementation of at least a portion of the one or more preferences of the UE. The described techniques include multiple benefits. The described techniques improve throughput (e.g., NR carrier aggregation throughput) based on the UE providing assistant information. Also, the described techniques reduce UE battery consumption based on the UE providing assistant information. Also, the described techniques reduce latency and satisfy quality of service (QoS) constraints based on the UE providing assistant information.

Figure 2:
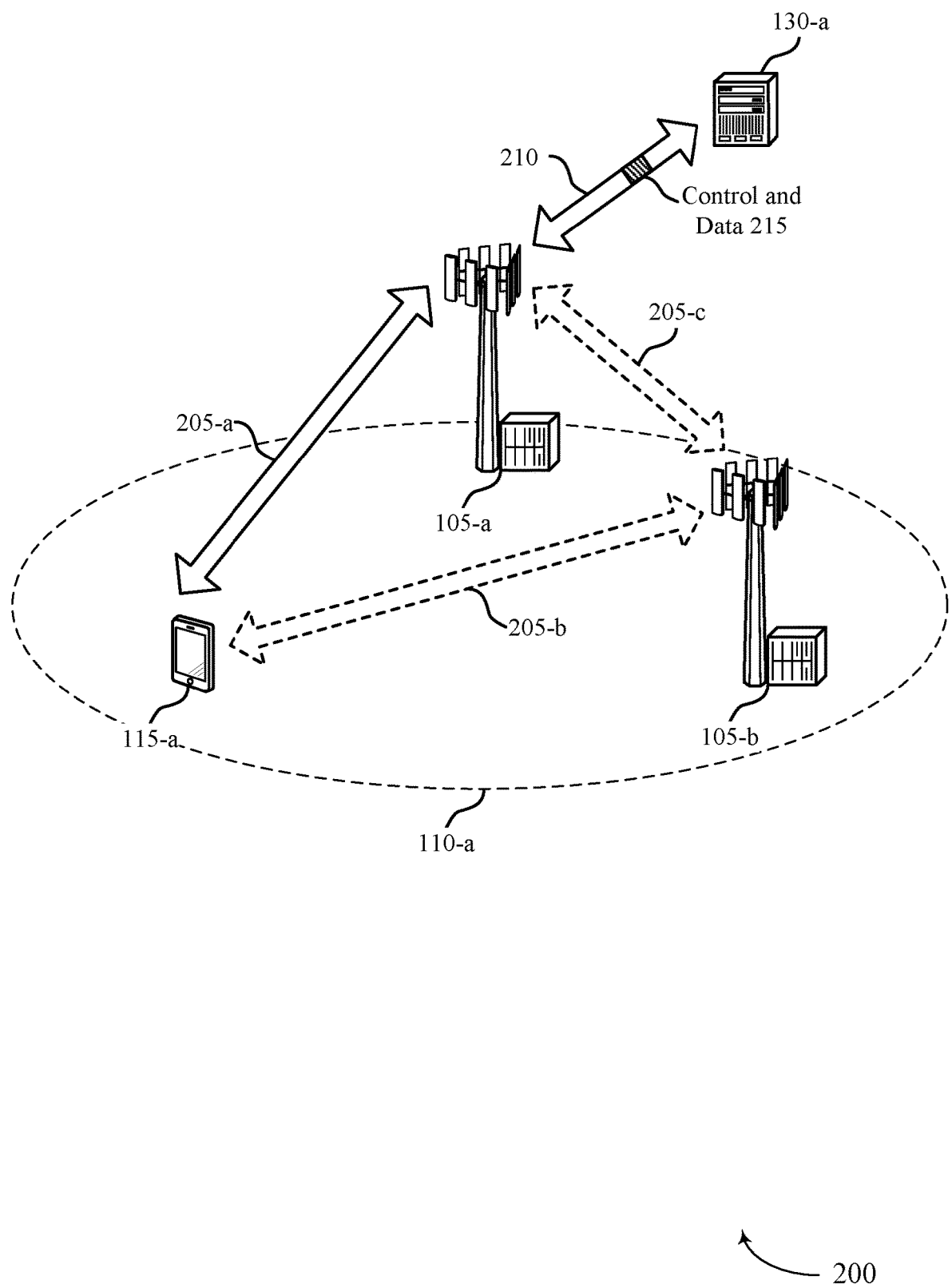
FIG. 2 illustrates an example of a wireless communication subsystem that supports techniques for assisted downlink HARQ feedback in carrier aggregation mode in accordance with aspects of the present disclosure.

FIG. 2 illustrates an example of a wireless communication subsystem 200 that supports techniques for assisted downlink HARQ feedback in carrier aggregation mode in accordance with aspects of the present disclosure. In some examples, wireless communication subsystem 200 may implement aspects of wireless communication system 100.

The wireless communications subsystem 200 may include base station 105-a, base station 105-b, UE 115-a, and core network 130-a, which may be examples of a base station 105, a UE 115, or a core network 130, respectively, as described with reference to FIG. 1. Base station 105-a or base station 105-b, or both, may serve a geographic coverage area 110-a. In the illustrated example, UE 115-a and base station 105-a may establish at least one communication link (e.g., communication link 205-a) and UE 115-a and base station 105-b may establish at least one communication link (e.g., communication link 205-b). In some cases, base station 105-a and base station 105-b may establish at least one communication link (e.g., communication link 205-c). As shown, base station 105-a may interface with core network 130-a through one or more backhaul links 210 (e.g., via an S1, N2, N3, or other interface). In some cases, base station 105-a and core network 130-a may communicate data and/or control through the one or more backhaul links 210. In some cases, base station 105-a and base station 105-b may communicate with one another over backhaul links (e.g., via an X2, Xn, or other interface) either directly (e.g., directly via communication link 205-c), or indirectly (e.g., via core network 130), or both. In some examples, the one or more backhaul links 210 may be or include one or more wireless links.

In some examples, base station 105-a may be associated with a primary cell group. In some examples, base station 105-a may be associated with a secondary cell group (e.g., a first secondary cell group). In some examples, base station 105-b may be associated with a secondary cell group (e.g., a second secondary cell group). In some examples, operations of base station 105-a, base station 105-b, UE 115-a, and core network 130-a may include NR carrier aggregation. In some examples, operations of base station 105-a, base station 105-b, UE 115-a, and core network 130-a may include NR inter-band carrier aggregation (e.g., via communication link 205-c) or NR intra-band carrier aggregation, or both. In some examples, operations of base station 105-a, base station 105-b, UE 115-a, and core network 130-a may include frequency division duplexing (FDD) carrier aggregation or (TDD) time division duplexing carrier aggregation, or FDD+TDD carrier aggregation, or TDD+TDD carrier aggregation, or any combination thereof. In some cases, base station 105-a may include a TDD-based cell for a primary cell or secondary cell, or a FDD-based cell for the primary cell or secondary cell. In some cases, base station 105-a may switch the primary cell or secondary cell of base station 105-a from being a TDD-based cell to being a FDD-based cell, or from being a FDD-based cell to being a TDD-based cell. In some cases, base station 105-b may include a TDD-based cell for a secondary cell or a FDD-based cell for the secondary cell. In some cases, base station 105-b may switch the secondary cell of base station 105-b from being a TDD-based cell to being a FDD-based cell, or from being a FDD-based cell to being a TDD-based cell.

In some examples, base station 105-a may switch from TDD-based to FDD-based or from FDD-based to TDD-based on an uplink (UL) coverage of UE 115-a in the primary cell group. In some examples, base station 105-a may operate as a TDD-based primary cell when the UL coverage is relatively strong (e.g., determine UL coverage is relatively strong based on a measurement (e.g., power measurement) or signal quality measurement from UE 115-a satisfying or exceeding a UL coverage threshold) and may operate as a FDD-based primary cell when the UL coverage is limited (e.g., determine UL coverage is limited based on a measurement or signal quality measurement from UE 115-a failing to satisfy or dropping below the UL coverage threshold). In some examples, base station 105-a may switch from being a FDD-based primary cell to a TDD-based primary cell when the base station 105-a determines the UL coverage is relatively strong. In some examples, base station 105-a may switch from being a TDD-based primary cell to a FDD-based primary cell when base station 105-a determines the UL coverage is limited.

In some examples, the NR carrier aggregation may be configured by base station 105-a or base station 105-b. In some examples, the primary cell group (and secondary cell group) of base station 105-a and secondary cell group of base station 105-b may operate in one or more frequency ranges. In some cases, the secondary cell group of base station 105-b may operate in frequency range 1 (FR1) or frequency range 2 (FR2), or both (e.g., switch from one frequency range to the other, switch from the other frequency range back to the one, FR1 NR carrier aggregation, FR2 NR carrier aggregation, FR1+FR2 NR carrier aggregation, NR carrier aggregation crossing FR1 and FR2).

In some examples, UE 115-*a* may transmit, to a base station (e.g., base station 105-*a* or base station 105-*b*) a message indicating one or more preferences of UE 115-*a*. In some examples, UE 115-*a* may transmit the message during a call setup operation, or during a call resume operation, or during a handover preparation operation, or during an ongoing call, or in a radio resource control message, or in a measurement report, or a unified air interface (UAI) message, or any combination thereof.

In some examples, the message may include a preferred hybrid automatic repeat request (HARQ) feedback configuration. The message may include a request to modify one or more aspects of a configuration of UE 115-*a* (e.g., HARQ feedback configuration or channel state information (CSI) configuration, or both). In some cases, UE 115-*a* may transmit the message based on a parameter of a configuration of UE 115-*a*. In some examples, the parameter of the configuration of UE 115-*a* may include a transmit power class, or channel bandwidth relative to at least one subcarrier spacing (SCS), or power consumption, or a bandwidth difference, or SCS difference, or quality of service (QoS) constraint, or any combination thereof. The transmit power class of UE 115-*a* may include a high power transmit class, or a medium power transmit class, or a low power transmit class, or any combination thereof.

In some examples, the base station (e.g., base station 105-*a* or base station 105-*b*) may receive the message from UE 115-*a* and determine whether to implement the preferences of UE 115-*a* based on one or more network conditions determined by the base station. The network condition may include a traffic buffer size, or a power measurement report from UE 115-*a*, or a power headroom report from UE 115-*a*, or sounding reference signal (SRS), or a signal-to-interference ratio (SINR), or an inter-site carrier aggregation limit, or a transport latency, or a transport bandwidth, or a radio access network split option, or measurement information from UE 115-*a*, or any combination thereof.

The base station may implement the preferences of the UE 115-*a*, or implement a portion of the preferences, or implement none of the preferences. In some cases, in addition to implementing at least a portion of the preferences or when implementing none, the base station may determine one or more changes to make to the configuration of UE 115-*a* based on receiving the message from the UE 115-*a* and the one or more network conditions (e.g., independent of the preferences of UE 115-*a*).

In some cases, the preferred HARQ feedback configuration or request to modify the configuration of UE 115-*a* is transmitted via a radio resource control (RRC) setup message, or a RRC resume message, or a measurement report (e.g., power measurement report), or a signal quality report, or any combination thereof. In some examples, UE 115-*a* may receive the HARQ feedback configuration or reconfiguration via a radio resource control (RRC) setup message, or a RRC resume message, or a RRC reconfiguration message, or a media access control-control element (MAC-CE) message, or a downlink control information, or any combination thereof.

In some examples, the base station (e.g., base station 105-*a* or base station 105-*b*) may transmit a confirmation message to UE 115-*a* based on the base station receiving the message from UE 115-*a* (e.g., requested preferences of UE 115-*a* regarding a HARQ feedback configuration or CSI configuration, or both). In some examples, the base station may transmit a HARQ feedback configuration or reconfiguration to UE 115-*a*.

The described operations of wireless communications subsystem 200 include multiple benefits. The described operations improve throughput (e.g., NR carrier aggregation throughput) based on the base station (base station 105-*a* or base station 105-*b*) transmitting the HARQ feedback configuration or reconfiguration to UE 115-*a* in response to the UE 115-transmitting a request for UE preferences in relation to a downlink HARQ feedback configuration. Also, the described operations reduce a battery consumption of UE 115-*a* based on the base station transmitting and implementing the HARQ feedback configuration or reconfiguration to UE 115-*a*. Also, the described techniques reduce latency and satisfy quality of service (QoS) constraints based on the base station (base station 105-*a* or base station 105-*b*) transmitting and implementing the HARQ feedback configuration or reconfiguration to UE 115-*a*.

Figure 3:
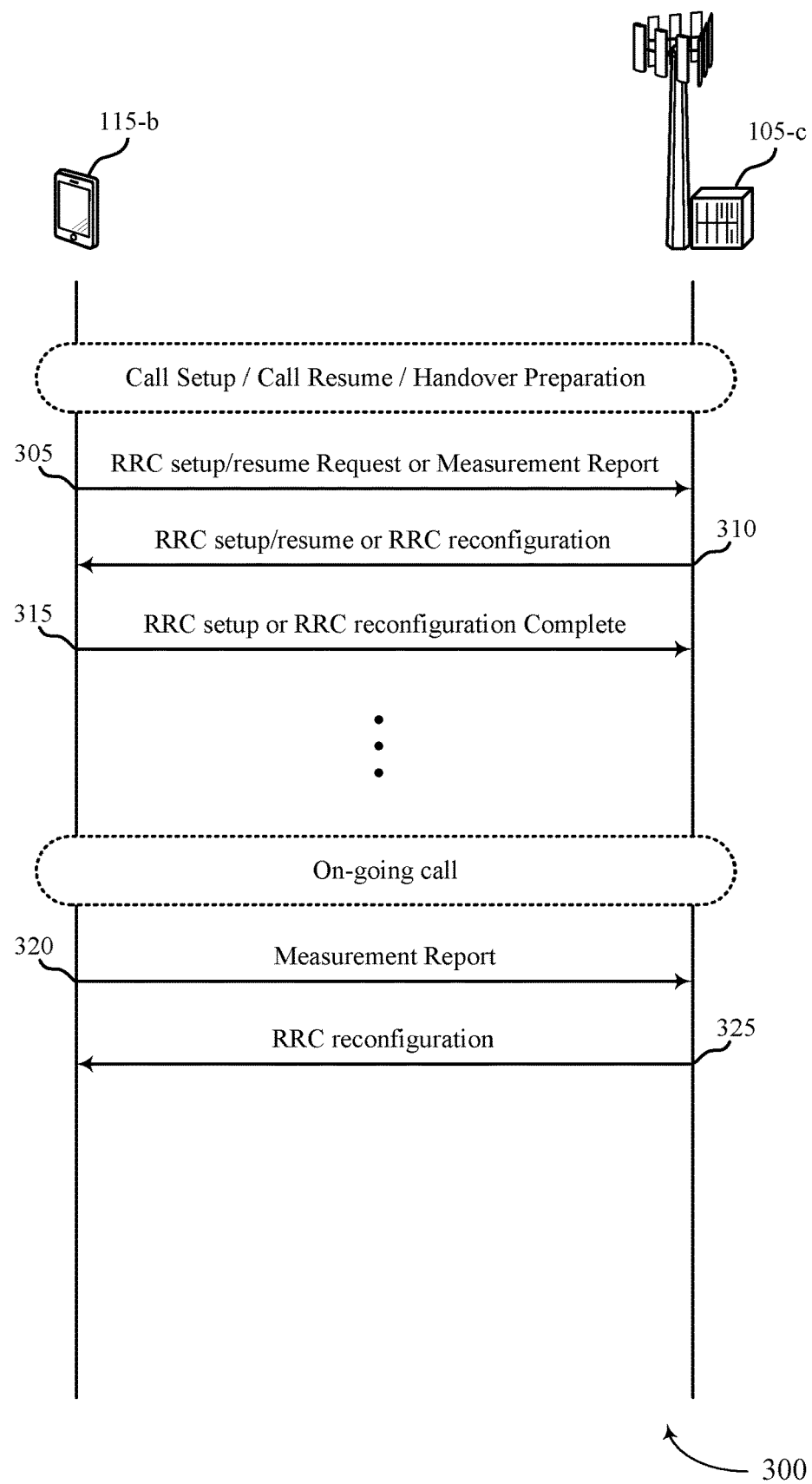
FIG. 3 illustrates an example of a process flow that supports techniques for assisted downlink HARQ feedback in carrier aggregation mode in accordance with aspects of the present disclosure.

FIG. 3 illustrates an example of a process flow 300 that supports techniques for assisted downlink HARQ feedback in carrier aggregation mode in accordance with aspects of the present disclosure. In some examples, process flow 300 may implement aspects of wireless communication system 100. In the example illustrated in FIG. 3, the process flow 300 may include UE 115-*b* and base station 105-*c*. In some examples, the process flow 300 may be based on a configuration of UE 115-*b* or base station 105-*c*, or both, and may be implemented by UE 115-*b* or base station 105-*c*, or both.

At 305, UE 115-*b* may transmit a message to base station 105-*c*. As shown, the message may be sent in association with a call setup operation, or a call resume operation, or a handover preparation operation, or any combination thereof. In some examples, the message may include a radio resource control (RRC) setup message, or a RRC resume message, or a measurement report of UE 115-*b*, or a signal quality report of UE 115-*b*, or any combination thereof. In some cases, the message may include one or more preferences of UE 115-*b* regarding a HARQ feedback configuration (e.g., request a modification of a current downlink HARQ feedback configuration, request a new downlink HARQ feedback configuration, etc.) or CSI configuration (e.g., request a modification of a current CSI configuration, request a new CSI configuration, etc.), or both. In some examples, UE 115-*b* may determine one or more parameters of a configuration of UE 115-*b* and transmit the message at 305 based on at least one of the determined parameters. The one or more parameters may include a transmit power class, or channel bandwidth relative to at least one subcarrier spacing (SCS), or power consumption, or a bandwidth difference, or SCS difference, or quality of service (QoS) constraint, or any combination thereof. The transmit power class of UE 115-*a* may include a high power transmit class, or a medium power transmit class, or a low power transmit class, or any combination thereof.

At 310, base station 105-*c* may transmit a confirmation message to UE 115-*b*. In some examples, the confirmation message may be transmitted via a RRC setup message, or a RRC resume message, or a RRC reconfiguration message, or a media access control-control element (MAC-CE) message, or a downlink control information, or any combination thereof. In some examples, the confirmation message may include a HARQ feedback configuration or reconfiguration. In some examples, the confirmation message may include a CSI configuration or reconfiguration.

At 315, UE 115-*b* may transmit a completion message to base station 105-*c*. In some examples, the completion message may indicate completion of a call setup operation, or completion of a call resume operation, or completion of a handover preparation operation, or any combination thereof. In some cases, the completion message may include an RRC setup complete message to indicate that RRC setup is completed on UE 115-b. In some cases, the completion message may include an RRC reconfiguration complete message to indicate that RRC reconfiguration is completed on UE 115-b.

At 320, UE 115-b may transmit a measurement report to base station 105-c. As shown, the measurement report may be sent in association with an on-going call of UE 115-b.

In some cases, the measurement report at 320 may include one or more preferences of UE 115-b regarding a HARQ feedback configuration (e.g., request a modification of a current downlink HARQ feedback configuration, request a new downlink HARQ feedback configuration, etc.) or CSI configuration (e.g., request a modification of a current CSI configuration, request a new CSI configuration, etc.), or both. In some cases, the measurement report at 320 may be transmitted via a unified air interface (UAI), or MAC-CE, or CSI. In some examples, UE 115-b may transmit the measurement report at 320 based on at least one of the parameters UE 115-b determines at 305. In some examples, UE 115-b may determine one or more parameters of a configuration of UE 115-b at 320 in relation to the on-going call and may transmit the measurement report at 320 based on at least one of the determined parameters from 320.

At 325, base station 105-c may transmit a reconfiguration message to UE 115-b. In some examples, the reconfiguration message may be transmitted via a RRC reconfiguration message, or MAC-CE message, or a downlink control information, or any combination thereof. In some examples, the reconfiguration message may include a HARQ feedback configuration or reconfiguration. In some examples, the reconfiguration message may include a CSI configuration or reconfiguration.

Figure 4:
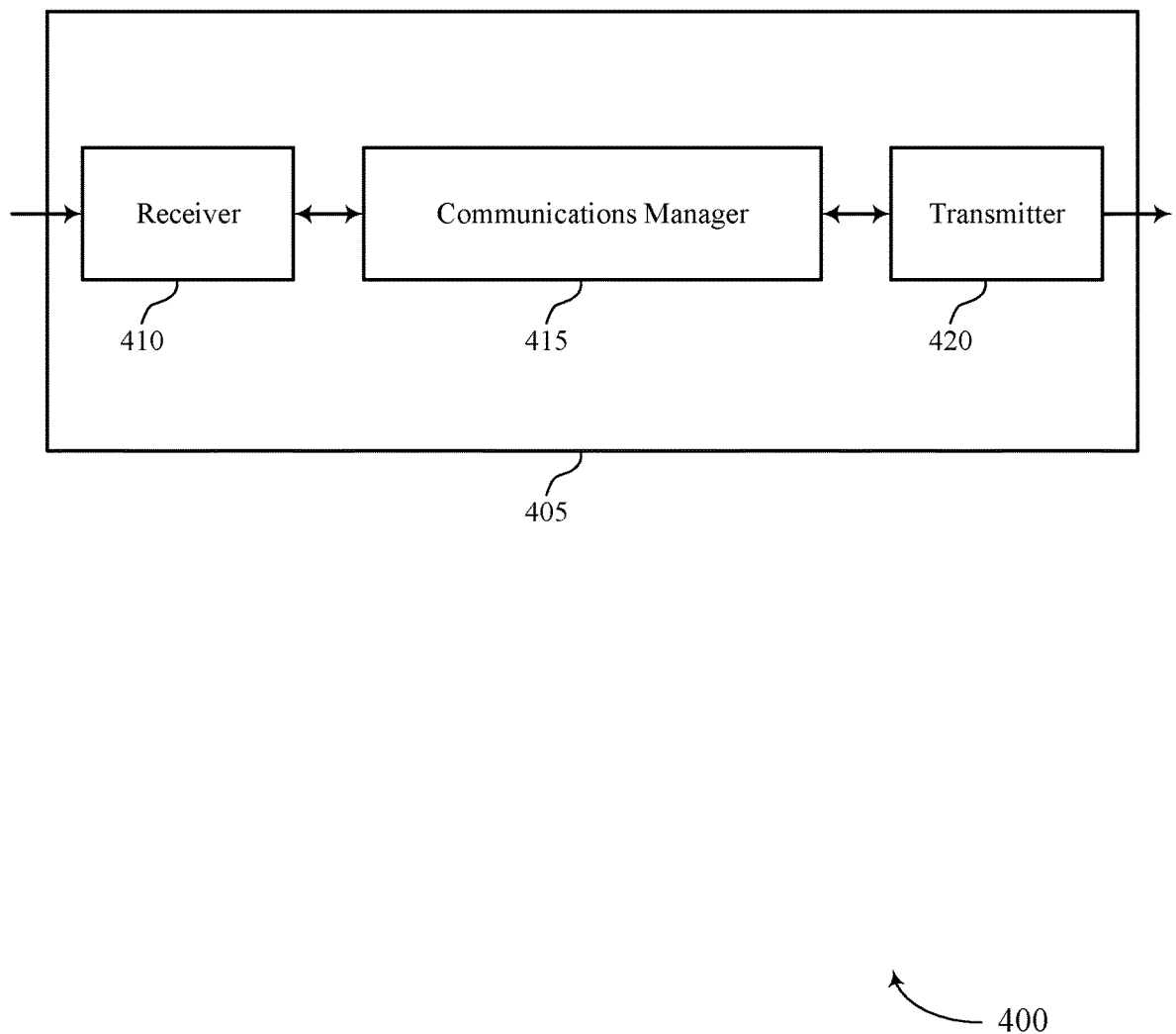
FIGS. 4 and 5 show block diagrams of devices that support techniques for assisted downlink HARQ feedback in carrier aggregation mode in accordance with aspects of the present disclosure.

FIG. 4 shows a block diagram 400 of a device 405 that supports techniques for assisted downlink HARQ feedback in carrier aggregation mode in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for assisted downlink HARQ feedback in carrier aggregation mode, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, to a base station based on a parameter of a configuration of the UE, a first HARQ feedback configuration or a request to modify the configuration of the UE, or both, the configuration of the UE including a carrier aggregation configuration and receive, from the base station based on transmitting the first HARQ feedback configuration or request to modify the configuration of the UE, or both, a second HARQ feedback configuration or reconfiguration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
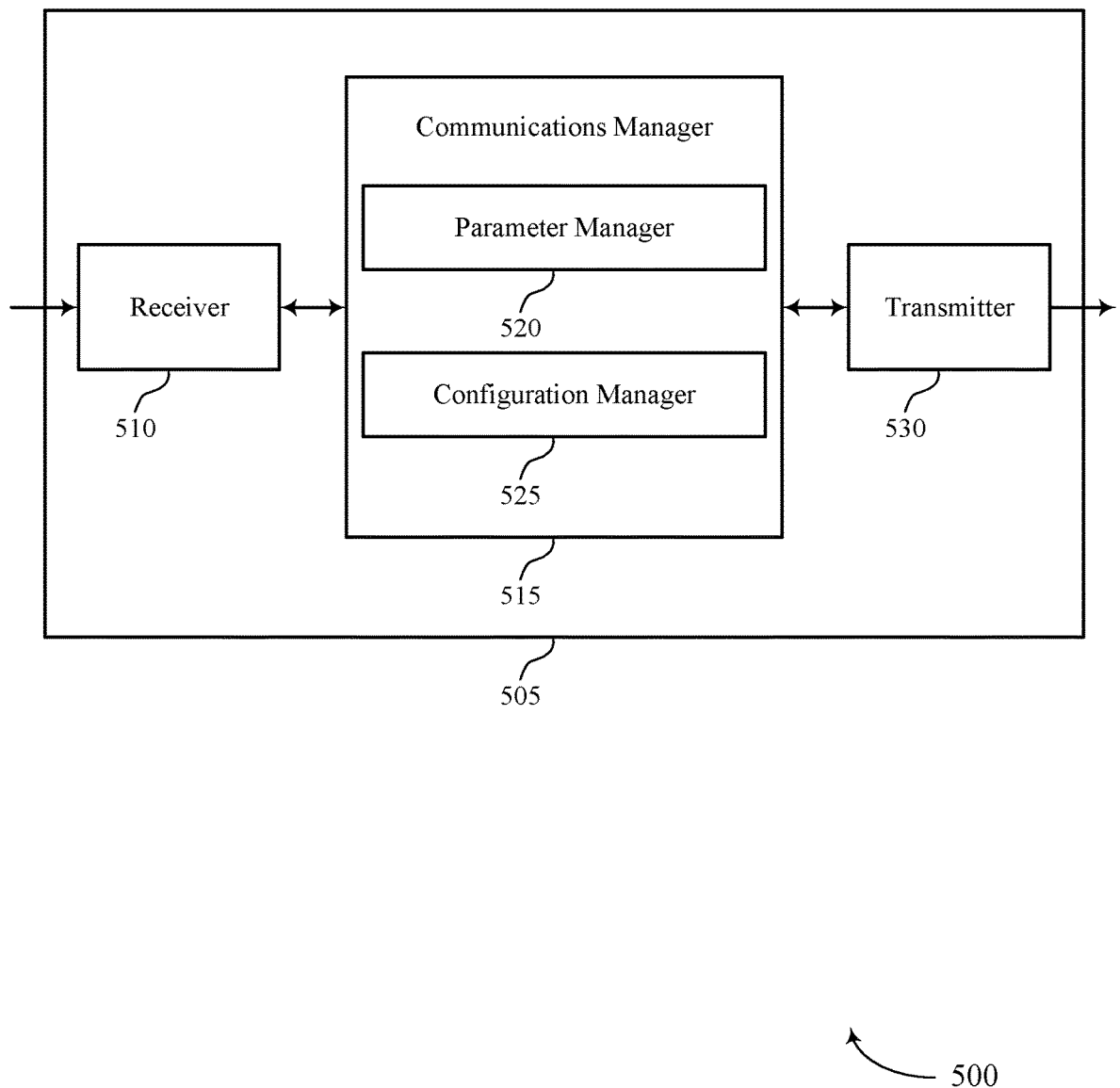

FIG. 5 shows a block diagram 500 of a device 505 that supports techniques for assisted downlink HARQ feedback in carrier aggregation mode in accordance with aspects of the present disclosure. The device 505 may be an example of aspects of a device 405, or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to techniques for assisted downlink HARQ feedback in carrier aggregation mode, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a parameter manager 520 and a configuration manager 525. The communications manager 515 may be an example of aspects of the communications manager 710 described herein.

The parameter manager 520 may transmit, to a base station based on a parameter of a configuration of the UE, a first HARQ feedback configuration or a request to modify the configuration of the UE, or both, the configuration of the UE including a carrier aggregation configuration.

The configuration manager 525 may receive, from the base station based on transmitting the first HARQ feedback configuration or request to modify the configuration of the UE, or both, a second HARQ feedback configuration or reconfiguration.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
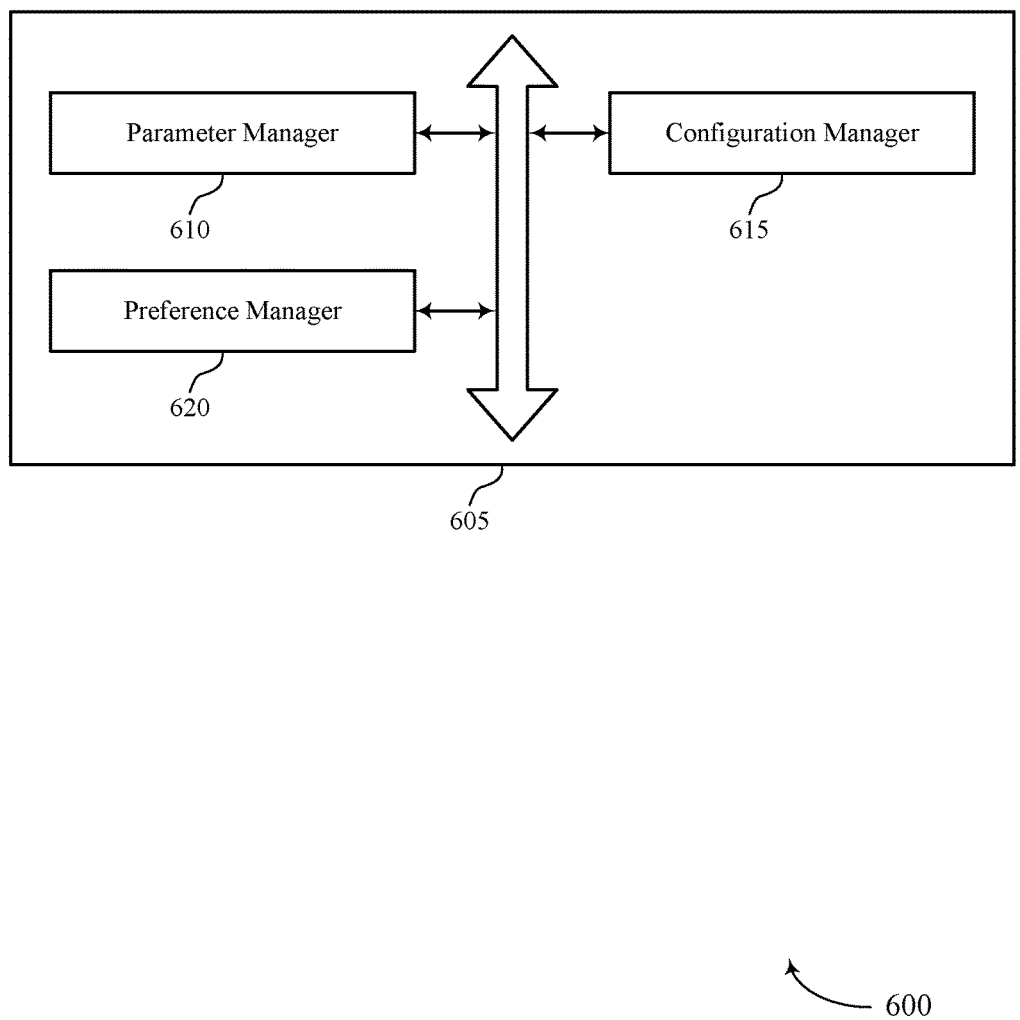
FIG. 6 shows a block diagram of a communications manager that supports techniques for assisted downlink HARQ feedback in carrier aggregation mode in accordance with aspects of the present disclosure.

FIG. 6 shows a block diagram 600 of a communications manager 605 that supports techniques for assisted downlink HARQ feedback in carrier aggregation mode in accordance with aspects of the present disclosure. The communications manager 605 may be an example of aspects of a communications manager 415, a communications manager 515, or a communications manager 710 described herein. The communications manager 605 may include a parameter manager 610, a configuration manager 615, and a preference manager 620. Each of these modules may communicate, directly or indirectly, with one another (e.g., via one or more buses).

The parameter manager 610 may transmit, to a base station based on a parameter of a configuration of the UE, a first HARQ feedback configuration or a request to modify the configuration of the UE, or both, the configuration of the UE including a carrier aggregation configuration.

In some cases, the first HARQ feedback configuration or request to modify the configuration of the UE is transmitted via a RRC setup message, or a RRC resume message, or a measurement report (e.g., power measurement report), or a signal quality report, or any combination thereof.

The configuration manager 615 may receive, from the base station based on transmitting the first HARQ feedback configuration or request to modify the configuration of the UE, or both, a second HARQ feedback configuration or reconfiguration.

In some examples, the configuration manager 615 may transmit the first HARQ feedback configuration or request to modify the configuration of the UE during a call setup operation, or during a call resume operation, or during a handover preparation operation, or during an on-going call, or in a radio resource control message, or in a measurement report, or a unified air interface (UAI) message, or any combination thereof.

In some examples, the configuration manager 615 may implement the one or more preferences of the UE for the configuration of the UE based on receiving the second HARQ feedback configuration or reconfiguration. In some examples, the configuration manager 615 may transmit an implementation complete message to the base station.

In some cases, the second HARQ feedback configuration or reconfiguration is received via a RRC setup message, or a RRC resume message, or a RRC reconfiguration message, or a media access control-control element (MAC-CE) message, or a downlink control information, or any combination thereof.

In some cases, the one or more preferences of the UE includes using one physical uplink channel group or multiple physical uplink channel groups for frequency division duplex spectrum downlink feedback. In some cases, the one or more preferences of the UE includes using a static codebook or a dynamic codebook for the downlink feedback. In some cases, the one or more preferences of the UE includes bundling the downlink feedback or multiplexing the downlink feedback.

In some cases, the downlink feedback includes downlink HARQ feedback. In some cases, the one or more preferences of the UE includes enabling the UE to switch between a carrier aggregation mode and a dual connectivity mode. In some cases, the one or more preferences of the UE includes enabling the UE to switch between a time division duplex spectrum and a frequency division duplex spectrum.

In some cases, the one or more preferences of the UE includes enabling the UE to switch between a first frequency range and a secondary frequency range. In some cases, the one or more preferences of the UE includes using a primary cell or using a primary secondary cell, or switching between the primary cell and the primary secondary cell. In some cases, the one or more preferences of the UE includes using a code block group (CBG) based acknowledgment feedback configuration or using a non-CBG acknowledgment feedback configuration.

In some cases, the one or more preferences of the UE includes using a slot based acknowledgment feedback configuration or using a sub-slot based acknowledgment feedback configuration. In some cases, the one or more preferences of the UE includes multiplexing channel state information and acknowledgment feedback, or dropping transmission of channel state information and maintaining transmission of acknowledgment feedback, or dropping transmission of acknowledgment feedback and maintaining transmission of channel state information, or any combination thereof. In some cases, the one or more preferences of the UE includes using a physical uplink control channel resource identifier within a physical uplink control channel resource set.

In some cases, the one or more preferences of the UE includes using channel state information omission rules to drop at least one component of a channel state information report. In some cases, the one or more preferences of the UE includes using a specified codebook type and a specified number of layers based on a number of bits used in channel state information. In some cases, the one or more preferences of the UE includes using a specified physical uplink control channel format and repetition, or using intra slot frequency hopping, or using inter slot frequency hopping, or using physical uplink control channel sequence hopping, or using any combination thereof. In some cases, the one or more preferences of the UE for the configuration of the UE includes at least one preference for the first HARQ feedback configuration or at least one preference for a CSI configuration, or both.

In some cases, the parameter of the configuration of the UE includes a transmit power class, or channel bandwidth relative to at least one subcarrier spacing (SCS), or power consumption, or a bandwidth difference, or SCS difference, or quality of service (QoS) constraint, or any combination thereof. In some cases, the transmit power class of the UE includes a high power transmit class, or a medium power transmit class, or a low power transmit class, or any combination thereof.

Figure 7:
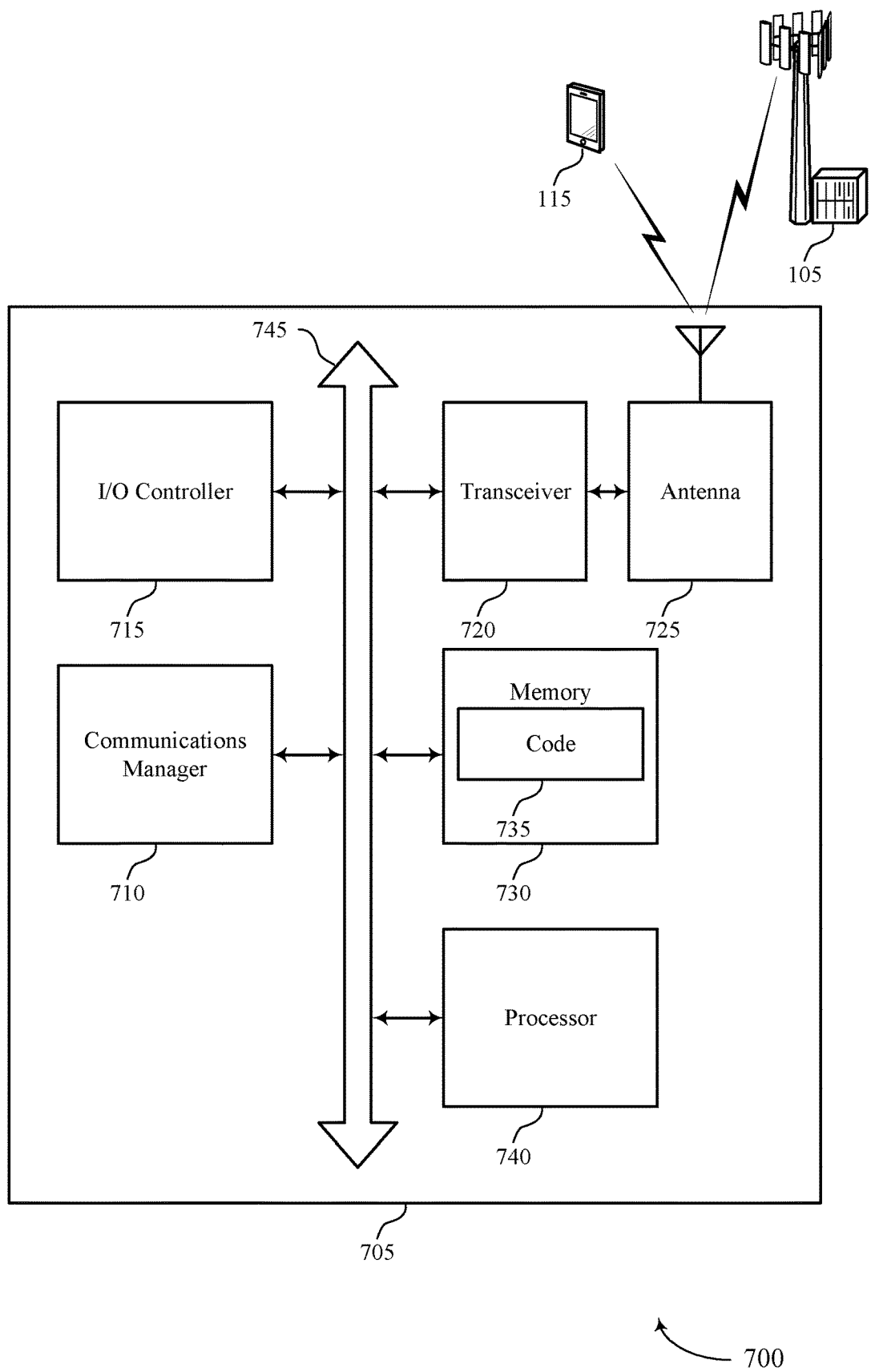
FIG. 7 shows a diagram of a system including a device that supports techniques for assisted downlink HARQ feedback in carrier aggregation mode in accordance with aspects of the present disclosure.

FIG. 7 shows a diagram of a system 700 including a device 705 that supports techniques for assisted downlink HARQ feedback in carrier aggregation mode in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, to a base station based on a parameter of a configuration of the UE, a first HARQ feedback configuration or a request to modify the configuration of the UE, or both, the configuration of the UE including a carrier aggregation configuration and receive, from the base station based on transmitting the first HARQ feedback configuration or request to modify the configuration of the UE, or both, a second HARQ feedback configuration or reconfiguration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for assisted downlink HARQ feedback in carrier aggregation mode).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
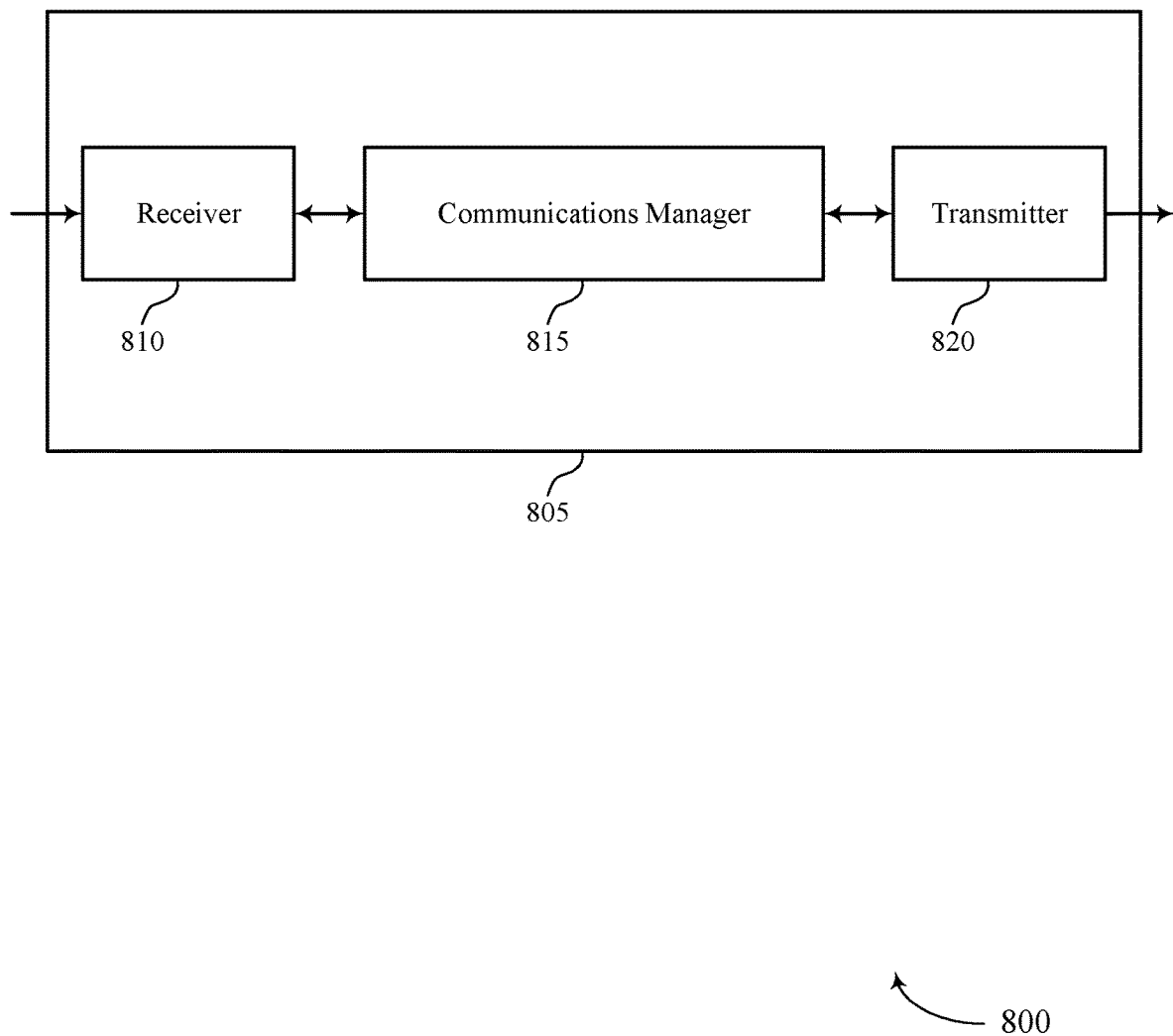
FIGS. 8 and 9 show block diagrams of devices that support techniques for assisted downlink HARQ feedback in carrier aggregation mode in accordance with aspects of the present disclosure.

FIG. 8 shows a block diagram 800 of a device 805 that supports techniques for assisted downlink HARQ feedback in carrier aggregation mode in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for assisted downlink HARQ feedback in carrier aggregation mode, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, a first HARQ feedback configuration or request to modify a configuration of the UE, or both, the configuration of the UE including a carrier aggregation configuration, implement, based on a network condition, at least a portion of one or more preferences of the UE associated with the first HARQ feedback configuration or request to modify a configuration of the UE, or both, and transmit, to the UE, a second HARQ feedback configuration or reconfiguration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
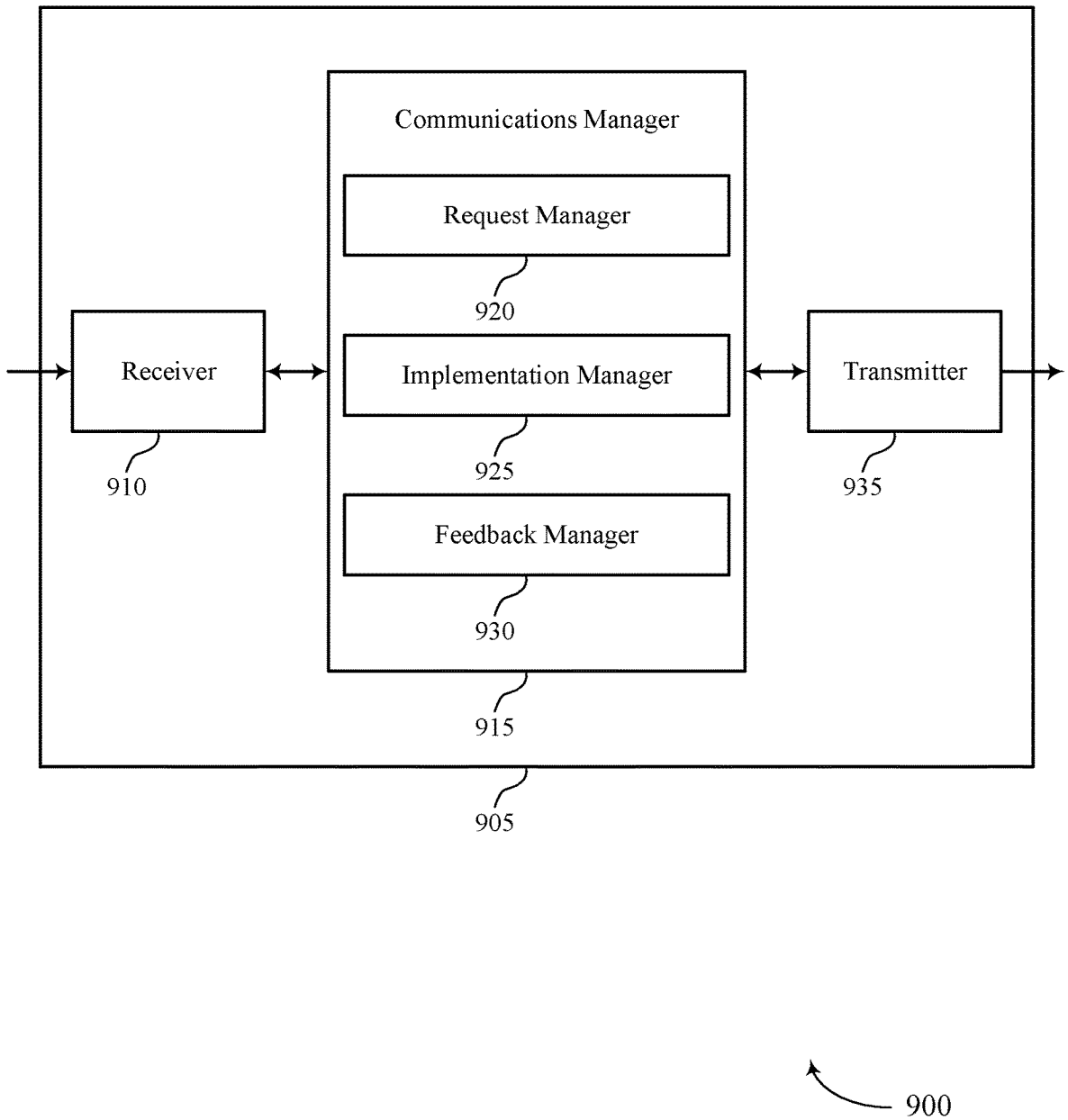

FIG. 9 shows a block diagram 900 of a device 905 that supports techniques for assisted downlink HARQ feedback in carrier aggregation mode in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for assisted downlink HARQ feedback in carrier aggregation mode, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a request manager 920, an implementation manager 925, and a feedback manager 930. The communications manager 915 may be an example of aspects of the communications manager 1110 described herein.

The request manager 920 may receive, from a UE, a first HARQ feedback configuration or request to modify a configuration of the UE, or both, the configuration of the UE including a carrier aggregation configuration.

The implementation manager 925 may implement, based on a network condition, at least a portion of one or more preferences of the UE associated with the first HARQ feedback configuration or request to modify a configuration of the UE, or both. The feedback manager 930 may transmit, to the UE, a second HARQ feedback configuration or reconfiguration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
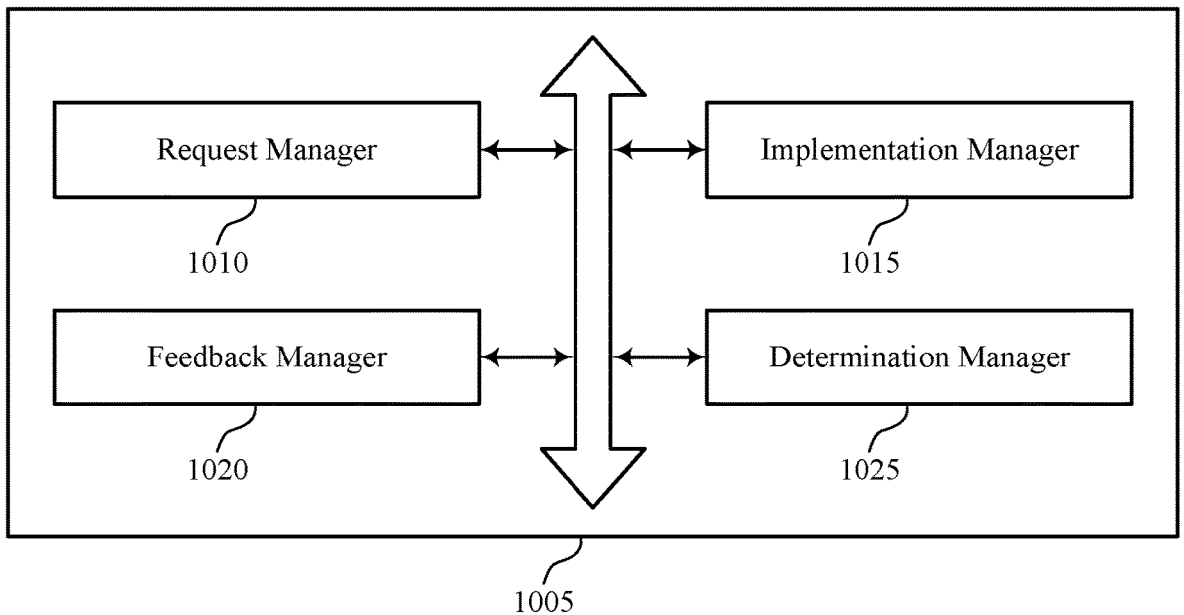
FIG. 10 shows a block diagram of a communications manager that supports techniques for assisted downlink HARQ feedback in carrier aggregation mode in accordance with aspects of the present disclosure.

FIG. 10 shows a block diagram 1000 of a communications manager 1005 that supports techniques for assisted downlink HARQ feedback in carrier aggregation mode in accordance with aspects of the present disclosure. The communications manager 1005 may be an example of aspects of a communications manager 815, a communications manager 915, or a communications manager 1110 described herein. The communications manager 1005 may include a request manager 1010, an implementation manager 1015, a feedback manager 1020, and a determination manager 1025. Each of these modules may communicate, directly or indirectly, with one another (e.g., via one or more buses).

The request manager 1010 may receive, from a UE, a first HARQ feedback configuration or request to modify a configuration of the UE, or both, the configuration of the UE including a carrier aggregation configuration.

In some examples, the request manager 1010 may receive the first HARQ feedback configuration or request to modify the configuration of the UE during a call setup operation, or during a call resume operation, or during a handover preparation operation, or during an on-going call, or in a radio resource control message, or in a measurement report, or in a unified air interface (UAI) message, or any combination thereof.

In some cases, the network condition includes a traffic buffer size, or a power measurement report from the UE, or a power headroom report from the UE, or SRS, or a signal-to-interference ratio (SINR), or an inter-site carrier aggregation limit, or a transport latency, or a transport bandwidth, or a radio access network split option, or measurement information from the UE, or any combination thereof.

The implementation manager 1015 may implement, based on a network condition, at least a portion of one or more preferences of the UE associated with the first HARQ feedback configuration or request to modify a configuration of the UE, or both. The feedback manager 1020 may transmit, to the UE, a second HARQ feedback configuration or reconfiguration. In some examples, the feedback manager 1020 may transmit the second HARQ feedback configuration to the UE based on receiving the first HARQ feedback configuration from the UE, or transmitting the reconfiguration to the UE based on receiving the request to modify the configuration of the UE.

In some cases, the second HARQ feedback configuration or reconfiguration is transmitted via a RRC setup message, or a RRC resume message, or a RRC reconfiguration message, or a media access control-control element (MAC-CE) message, or a downlink control information, or any combination thereof. In some cases, the first HARQ feedback configuration or request to modify the configuration of the UE is received via a RRC setup message, or a RRC resume message, or a measurement report (e.g., power measurement report), or a signal quality report, or any combination thereof.

In some cases, the one or more preferences of the UE are based on a downlink feedback configuration of the UE or a channel state information configuration of the UE, or both. In some cases, the downlink feedback includes downlink HARQ feedback.

The determination manager 1025 may determine whether to modify the UE configuration based on the network condition and at least a portion of the one or more preferences of the UE, or determining whether to modify the UE configuration based on the network condition while disregarding the one or more preferences of the UE.

Figure 11:
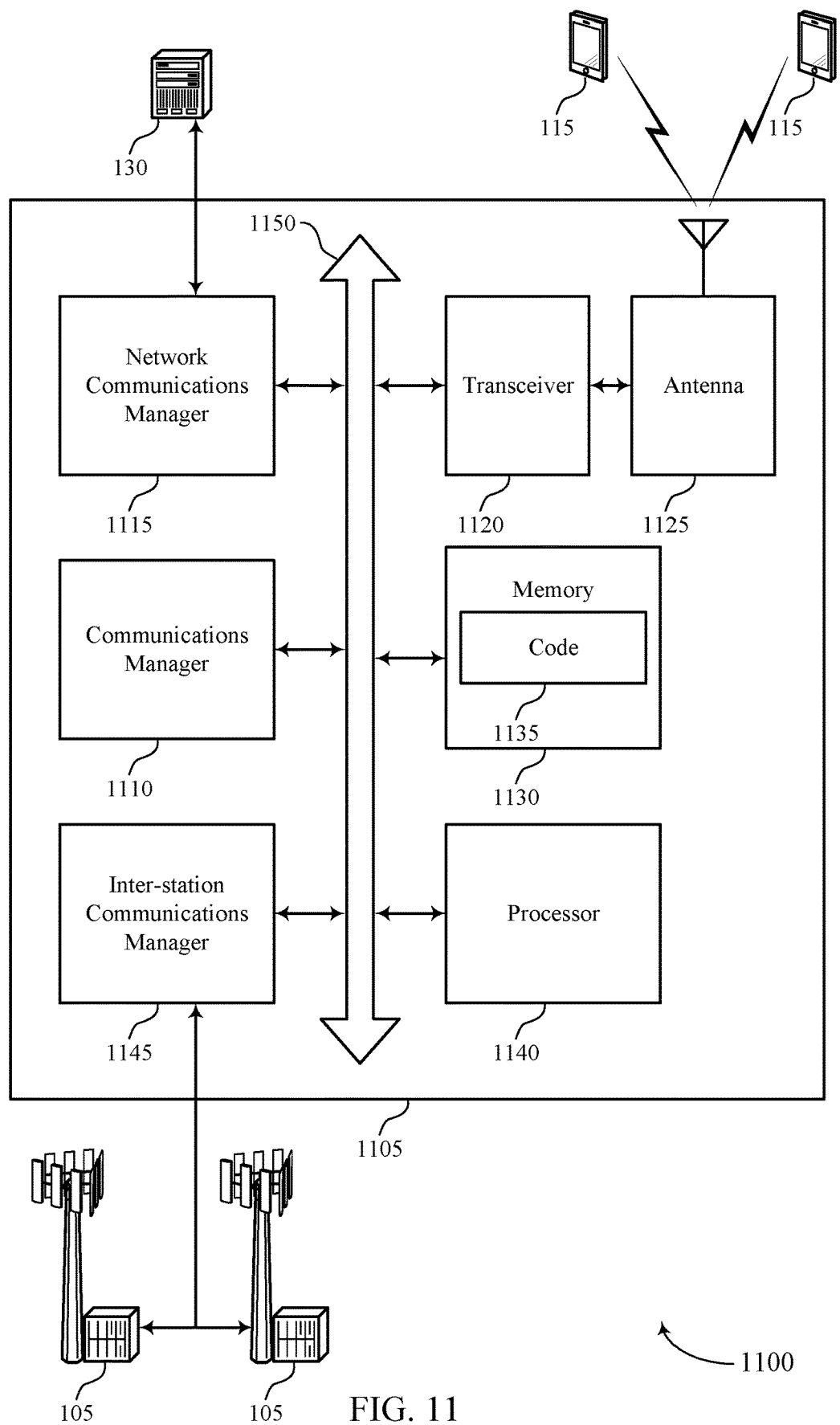
FIG. 11 shows a diagram of a system including a device that supports techniques for assisted downlink HARQ feedback in carrier aggregation mode in accordance with aspects of the present disclosure.

FIG. 11 shows a diagram of a system 1100 including a device 1105 that supports techniques for assisted downlink HARQ feedback in carrier aggregation mode in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a UE, a first HARQ feedback configuration or request to modify a configuration of the UE, or both, the configuration of the UE including a carrier aggregation configuration, implement, based on a network condition, at least a portion of one or more preferences of the UE associated with the first HARQ feedback configuration or request to modify a configuration of the UE, or both, and transmit, to the UE, a second HARQ feedback configuration or reconfiguration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for assisted downlink HARQ feedback in carrier aggregation mode).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
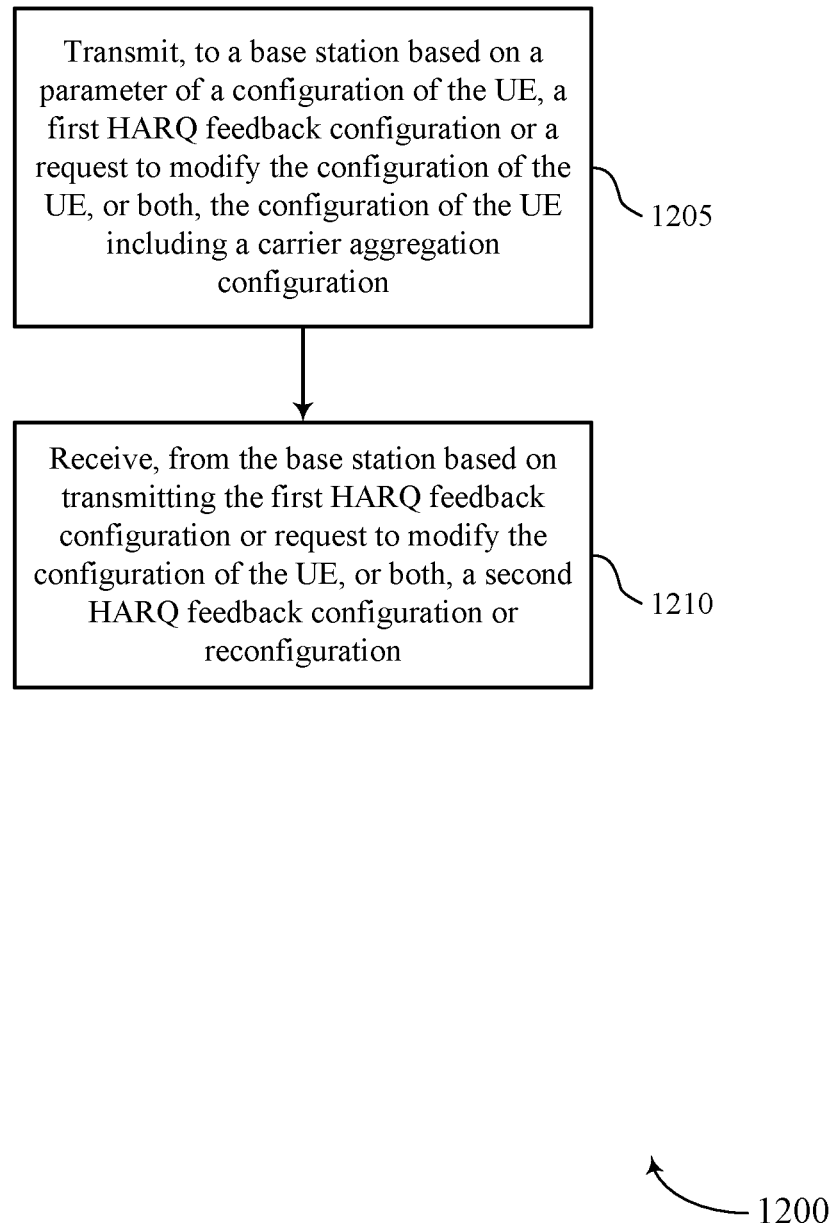
FIGS. 12 through 15 show flowcharts illustrating methods that support techniques for assisted downlink HARQ feedback in carrier aggregation mode in accordance with aspects of the present disclosure.

FIG. 12 shows a flowchart illustrating a method 1200 that supports techniques for assisted downlink HARQ feedback in carrier aggregation mode in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit, to a base station based on a parameter of a configuration of the UE, a first HARQ feedback configuration or a request to modify the configuration of the UE, or both, the configuration of the UE including a carrier aggregation configuration. The operations of 1205 may be performed according to the methods described herein. In some examples, aspects of the operations of 1205 may be performed by a parameter manager as described with reference to FIGS. 4 through 7.

At 1210, the UE may receive, from the base station based on transmitting the first HARQ feedback configuration or request to modify the configuration of the UE, or both, a second HARQ feedback configuration or reconfiguration. The operations of 1210 may be performed according to the methods described herein. In some examples, aspects of the operations of 1210 may be performed by a configuration manager as described with reference to FIGS. 4 through 7.

Figure 13:
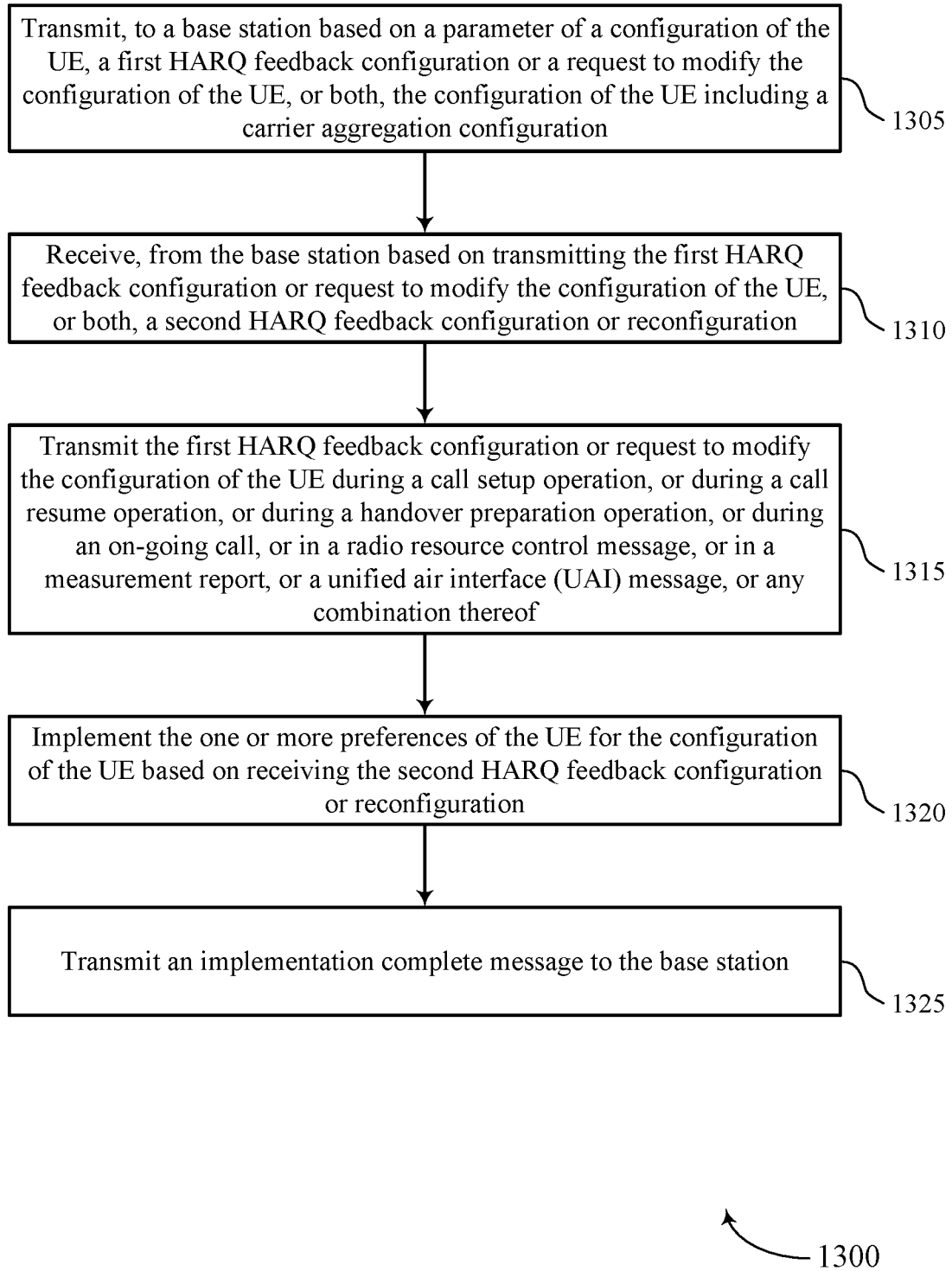

FIG. 13 shows a flowchart illustrating a method 1300 that supports techniques for assisted downlink HARQ feedback in carrier aggregation mode in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station based on a parameter of a configuration of the UE, a first HARQ feedback configuration or a request to modify the configuration of the UE, or both, the configuration of the UE including a carrier aggregation configuration. The operations of 1305 may be performed according to the methods described herein. In some examples, aspects of the operations of 1305 may be performed by a parameter manager as described with reference to FIGS. 4 through 7.

At 1310, the UE may receive, from the base station based on transmitting the first HARQ feedback configuration or request to modify the configuration of the UE, or both, a second HARQ feedback configuration or reconfiguration. The operations of 1310 may be performed according to the methods described herein. In some examples, aspects of the operations of 1310 may be performed by a configuration manager as described with reference to FIGS. 4 through 7.

At 1315, the UE may transmit the first HARQ feedback configuration or request to modify the configuration of the UE during a call setup operation, or during a call resume operation, or during a handover preparation operation, or during an on-going call, or in a radio resource control message, or in a measurement report, or a unified air interface (UAI) message, or any combination thereof. The operations of 1315 may be performed according to the methods described herein. In some examples, aspects of the operations of 1315 may be performed by a configuration manager as described with reference to FIGS. 4 through 7.

At 1320, the UE may implement the one or more preferences of the UE for the configuration of the UE based on receiving the second HARQ feedback configuration or reconfiguration. The operations of 1320 may be performed according to the methods described herein. In some examples, aspects of the operations of 1320 may be performed by a configuration manager as described with reference to FIGS. 4 through 7.

At 1325, the UE may transmit an implementation complete message to the base station. The operations of 1325 may be performed according to the methods described herein. In some examples, aspects of the operations of 1325 may be performed by a configuration manager as described with reference to FIGS. 4 through 7.

Figure 14:
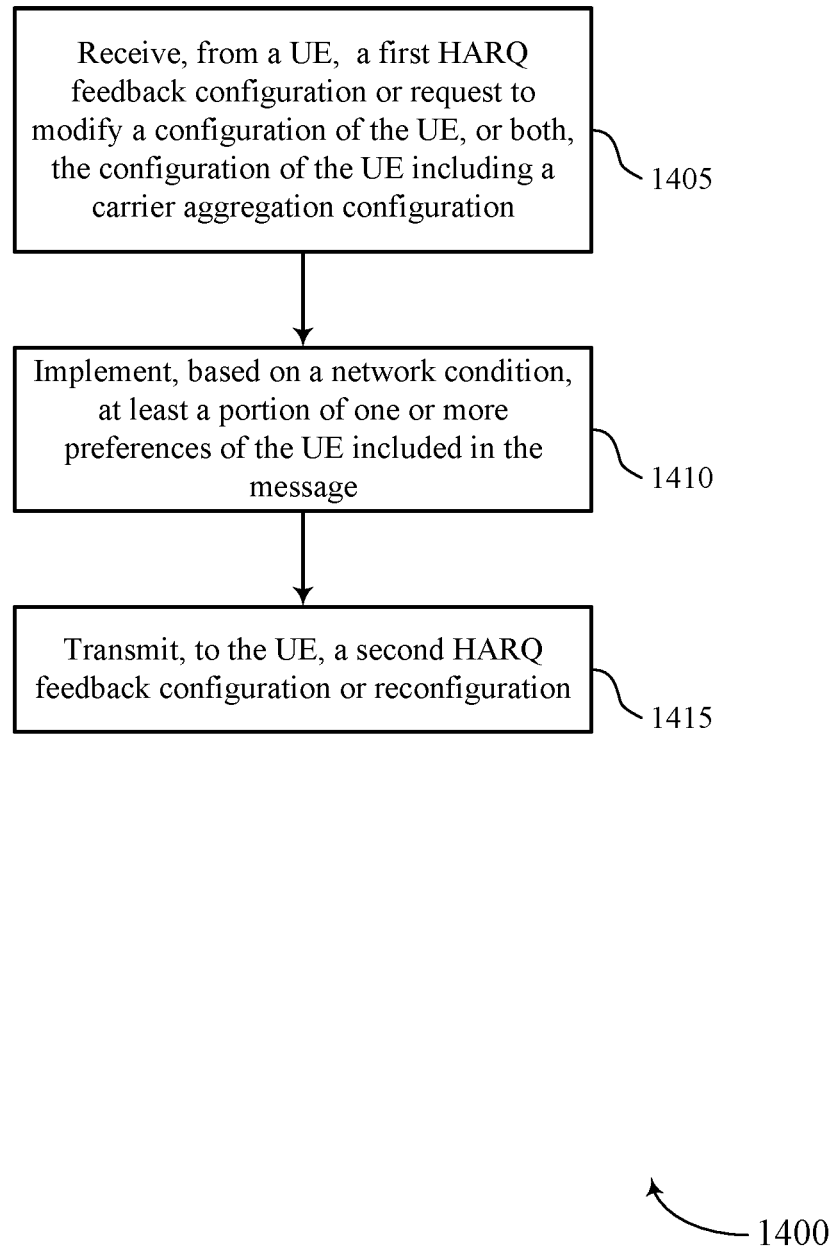

FIG. 14 shows a flowchart illustrating a method 1400 that supports techniques for assisted downlink HARQ feedback in carrier aggregation mode in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive, from a UE, a first HARQ feedback configuration or request to modify a configuration of the UE, or both, the configuration of the UE including a carrier aggregation configuration. The operations of 1405 may be performed according to the methods described herein. In some examples, aspects of the operations of 1405 may be performed by a request manager as described with reference to FIGS. 8 through 11.

At 1410, the base station may implement, based on a network condition, at least a portion of one or more preferences of the UE associated with the first HARQ feedback configuration or request to modify a configuration of the UE, or both. The operations of 1410 may be performed according to the methods described herein. In some examples, aspects of the operations of 1410 may be performed by an implementation manager as described with reference to FIGS. 8 through 11.

At 1415, the base station may transmit, to the UE, a second HARQ feedback configuration or reconfiguration. The operations of 1415 may be performed according to the methods described herein. In some examples, aspects of the operations of 1415 may be performed by a feedback manager as described with reference to FIGS. 8 through 11.

Figure 15:
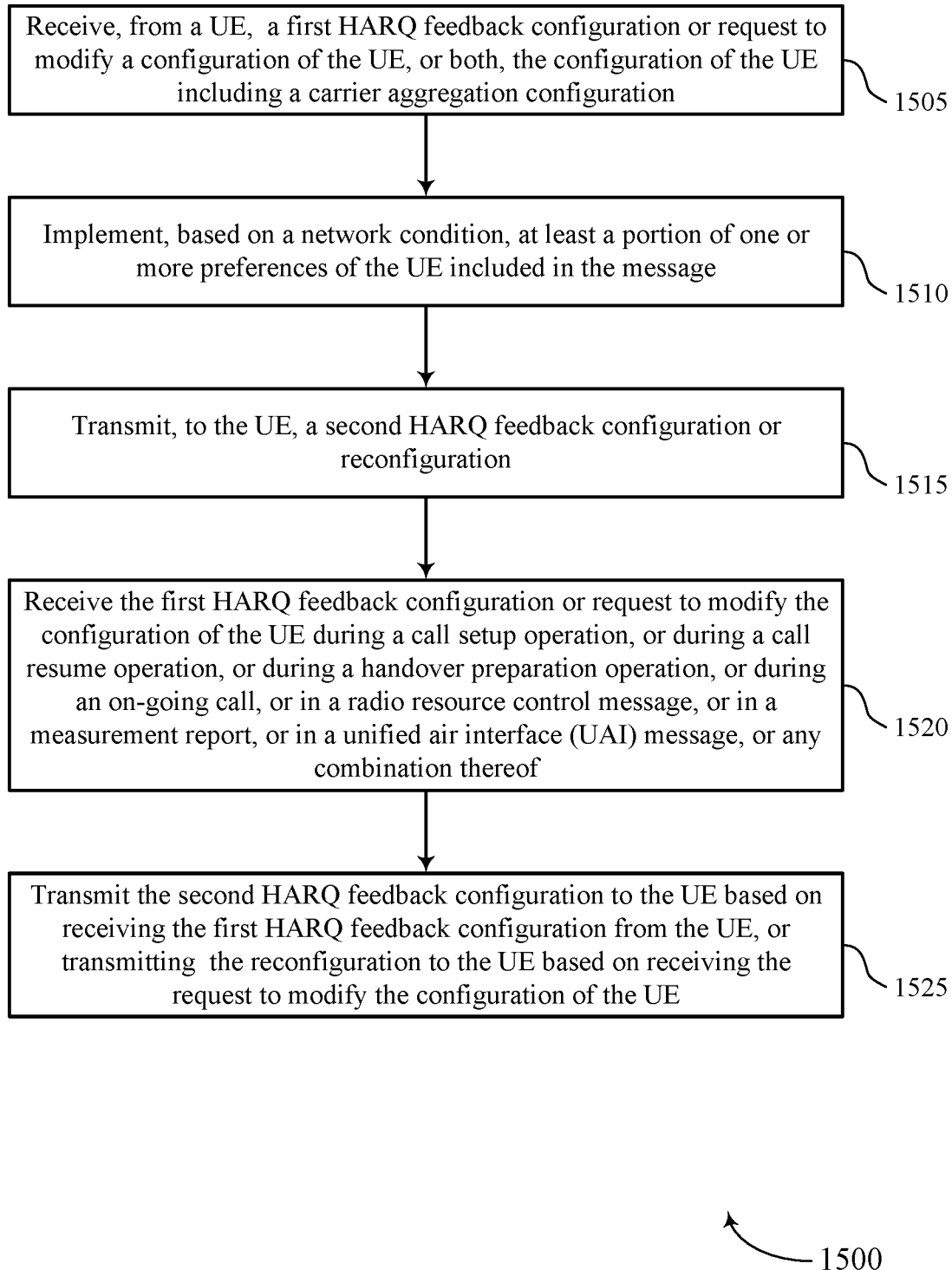

FIG. 15 shows a flowchart illustrating a method 1500 that supports techniques for assisted downlink HARQ feedback in carrier aggregation mode in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive, from a UE, a first HARQ feedback configuration or request to modify a configuration of the UE, or both, the configuration of the UE including a carrier aggregation configuration. The operations of 1505 may be performed according to the methods described herein. In some examples, aspects of the operations of 1505 may be performed by a request manager as described with reference to FIGS. 8 through 11.

At 1510, the base station may implement, based on a network condition, at least a portion of one or more preferences of the UE associated with the first HARQ feedback configuration or request to modify a configuration of the UE, or both. The operations of 1510 may be performed according to the methods described herein. In some examples, aspects of the operations of 1510 may be performed by an implementation manager as described with reference to FIGS. 8 through 11.

At 1515, the base station may transmit, to the UE, a second HARQ feedback configuration or reconfiguration. The operations of 1515 may be performed according to the methods described herein. In some examples, aspects of the operations of 1515 may be performed by a feedback manager as described with reference to FIGS. 8 through 11.

At 1520, the base station may receive the first HARQ feedback configuration or request to modify the configuration of the UE during a call setup operation, or during a call resume operation, or during a handover preparation operation, or during an on-going call, or in a radio resource control message, or in a measurement report, or in a unified air interface (UAI) message, or any combination thereof. The operations of 1520 may be performed according to the methods described herein. In some examples, aspects of the operations of 1520 may be performed by a request manager as described with reference to FIGS. 8 through 11.

At 1525, the base station may transmit the second HARQ feedback configuration to the UE based on receiving the first HARQ feedback configuration from the UE, or transmitting the reconfiguration to the UE based on receiving the request to modify the configuration of the UE. The operations of 1525 may be performed according to the methods described herein. In some examples, aspects of the operations of 1525 may be performed by a feedback manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to a network entity based at least in part on a parameter of a configuration of the UE, a message that includes a first hybrid automatic repeat request (HARQ) feedback configuration or a request to modify the configuration of the UE, or both, the configuration of the UE including a carrier aggregation configuration;
    receiving, from the network entity, a second HARQ feedback configuration or reconfiguration;
    implementing one or more preferences of the UE for the configuration of the UE based at least in part on receiving the second HARQ feedback configuration or reconfiguration; and
    transmitting an implementation complete message to the network entity.

2. The method of claim 1, further comprising:
    transmitting the message that includes the first HARQ feedback configuration or the request to modify the configuration of the UE during a call setup operation, or during a call resume operation, or during a handover preparation operation, or during an on-going call, or in a radio resource control message, or in a measurement report, or a unified air interface (UAI) message, or any combination thereof.

3. The method of claim 1, wherein the message that includes the first HARQ feedback configuration or the request to modify the configuration of the UE is transmitted via a radio resource control (RRC) setup message, or a RRC resume message, or a measurement report, or a signal quality report, or any combination thereof.

4. The method of claim 1, wherein the second HARQ feedback configuration or reconfiguration is received via a radio resource control (RRC) setup message, or a RRC resume message, or a RRC reconfiguration message, or a media access control-control element (MAC-CE) message, or a downlink control information, or any combination thereof.

5. The method of claim 1, wherein the one or more preferences of the UE comprises using one physical uplink channel group or multiple physical uplink channel groups for downlink feedback.

6. The method of claim 5, wherein the one or more preferences of the UE comprises using a static codebook or a dynamic codebook for the downlink feedback.

7. The method of claim 5, wherein the one or more preferences of the UE comprises bundling the downlink feedback or multiplexing the downlink feedback.

8. The method of claim 5, wherein the downlink feedback comprises downlink HARQ feedback associated with the first HARQ feedback configuration or the second HARQ feedback configuration.

9. The method of claim 1, wherein the one or more preferences of the UE comprises enabling the UE to switch between a carrier aggregation mode and a dual connectivity mode for downlink feedback.

10. The method of claim 1, wherein the one or more preferences of the UE comprises enabling the UE to switch between a time division duplex spectrum and a frequency division duplex spectrum for downlink feedback.

11. The method of claim 1, wherein the one or more preferences of the UE comprises enabling the UE to switch between a first frequency range and a secondary frequency range for downlink feedback.

12. The method of claim 1, wherein the one or more preferences of the UE comprises using a primary cell or using a primary secondary cell, or switching between the primary cell and the primary secondary cell for downlink feedback.

13. The method of claim 1, wherein the one or more preferences of the UE comprises using a code block group (CBG) based acknowledgment feedback configuration or using a non-CBG acknowledgment feedback configuration.

14. The method of claim 1, wherein the one or more preferences of the UE comprises using a slot based acknowledgment feedback configuration or using a sub-slot based acknowledgment feedback configuration.

15. The method of claim 1, wherein the one or more preferences of the UE comprises multiplexing channel state information and acknowledgment feedback, or dropping transmission of channel state information and maintaining transmission of acknowledgment feedback, or dropping transmission of acknowledgment feedback and maintaining transmission of channel state information, or any combination thereof.

16. The method of claim 1, wherein the one or more preferences of the UE comprises using a physical uplink control channel resource identifier within a physical uplink control channel resource set.

17. The method of claim 1, wherein the one or more preferences of the UE comprises using channel state information omission rules to drop at least one component of a channel state information report.

18. The method of claim 1, wherein the one or more preferences of the UE comprises using a specified codebook type and a specified number of layers based at least in part on a number of bits used in channel state information.

19. The method of claim 1, wherein the one or more preferences of the UE comprises using a specified physical uplink control channel format and repetition, or using intra slot frequency hopping, or using inter slot frequency hopping, or using physical uplink control channel sequence hopping, or using any combination thereof for downlink feedback.

20. The method of claim 1, wherein the one or more preferences of the UE for the configuration of the UE comprises at least one preference for the first HARQ feedback configuration or at least one preference for a channel state information (CSI) configuration, or both.

21. The method of claim 1, wherein the parameter of the configuration of the UE comprises a transmit power class, or channel bandwidth relative to at least one subcarrier spacing (SCS), or power consumption, or a bandwidth difference, or SCS difference, or quality of service (QoS) constraint, or any combination thereof.

22. The method of claim 21, wherein the transmit power class of the UE comprises a high power transmit class, or a medium power transmit class, or a low power transmit class, or any combination thereof.

23. An apparatus for wireless communications at a user equipment (UE), comprising:
    a processor,
    memory coupled with the processor; and
    instructions stored in the memory and executable by the processor to cause the apparatus to:
        transmit, to a network entity based at least in part on a parameter of a configuration of the UE, a message that includes a first hybrid automatic repeat request (HARQ) feedback configuration or a request to modify the configuration of the UE, or both, the configuration of the UE including a carrier aggregation configuration;
        receive, from the network entity, a second HARQ feedback configuration or reconfiguration;
        implement one or more preferences of the UE for the configuration of the UE based at least in part on receiving the second HARQ feedback configuration or reconfiguration; and
        transmit an implementation complete message to the network entity.

24. An apparatus for wireless communications at a user equipment (UE), comprising:
    means for transmitting, to a network entity based at least in part on a parameter of a configuration of the UE, a message that includes a first hybrid automatic repeat request (HARQ) feedback configuration or a request to modify the configuration of the UE, or both, the configuration of the UE including a carrier aggregation configuration;
    means for receiving, from the network entity, a second HARQ feedback configuration or reconfiguration;
    means for implementing one or more preferences of the UE for the configuration of the UE based at least in part on receiving the second HARQ feedback configuration or reconfiguration; and
    means for transmitting an implementation complete message to the network entity.

25. A non-transitory computer-readable medium storing code for wireless communications at a user equipment (UE), the code comprising instructions executable by a processor to:

transmit, to a network entity based at least in part on a parameter of a configuration of the UE, a message that includes a first hybrid automatic repeat request (HARQ) feedback configuration or a request to modify the configuration of the UE, or both, the configuration of the UE including a carrier aggregation configuration;

receive, from the network entity, a second HARQ feedback configuration or reconfiguration;

implement one or more preferences of the UE for the configuration of the UE based at least in part on receiving the second HARQ feedback configuration or reconfiguration; and transmit an implementation complete message to the network entity.

* * * * *